(12) United States Patent
Shaath

(10) Patent No.: US 9,361,243 B2
(45) Date of Patent: *Jun. 7, 2016

(54) METHOD AND SYSTEM FOR PROVIDING RESTRICTED ACCESS TO A STORAGE MEDIUM

(75) Inventor: Kamel Shaath, Kanata (CA)

(73) Assignee: KOM Networks Inc., Kanata, ON (CA)

( * ) Notice: Subject to any disclaimer, the term of this patent is extended or adjusted under 35 U.S.C. 154(b) by 131 days.

This patent is subject to a terminal disclaimer.

(21) Appl. No.: 13/562,312

(22) Filed: Jul. 31, 2012

(65) Prior Publication Data

US 2013/0198474 A1 Aug. 1, 2013

Related U.S. Application Data

(60) Continuation-in-part of application No. 12/431,387, filed on Apr. 28, 2009, now Pat. No. 8,234,477, which is a continuation-in-part of application No. 11/482,115, filed on Jul. 7, 2006, now Pat. No.

(Continued)

(30) Foreign Application Priority Data

Jul. 31, 1998 (CA) ...................................... 2244626

(51) Int. Cl.
*G06F 12/14* (2006.01)
*G06F 21/62* (2013.01)

(52) U.S. Cl.
CPC ........ *G06F 12/1416* (2013.01); *G06F 12/1466* (2013.01); *G06F 21/6227* (2013.01); *G06F 2221/2141* (2013.01)

(58) Field of Classification Search
CPC ... G06F 12/14; G06F 12/1416; G06F 12/145; G06F 12/1466; G06F 12/1483; G06F 21/6227; G06F 2221/2141
See application file for complete search history.

(56) References Cited

U.S. PATENT DOCUMENTS

| | | | |
|---|---|---|---|
| 3,996,564 A | 12/1976 | Kerrigan et al. | |
| 4,104,718 A | 8/1978 | Poublan et al. | |
| 4,399,504 A | 8/1983 | Obermarck et al. | |

(Continued)

FOREIGN PATENT DOCUMENTS

| EP | 0515073 A | 11/1992 |
|---|---|---|
| EP | 0515073 A | 11/1992 |

(Continued)

OTHER PUBLICATIONS

Gable, Records Management for Electronic Documnets, Oct. 1997, ARMA Records Management Quarterly, pp. 15-19.

(Continued)

*Primary Examiner* — Hiep Nguyen
(74) *Attorney, Agent, or Firm* — ATFirm PLLC; Ralph P. Albrecht

(57) ABSTRACT

A system, apparatus, method, or computer program product of restricting file access is disclosed wherein a set of file write access commands are determined from data stored within a storage medium. The set of file write access commands are for the entire storage medium. Any matching file write access command provided to the file system for that storage medium results in an error message. Other file write access commands are, however, passed onto a device driver for the storage medium and are implemented. In this way commands such as file delete and file overwrite can be disabled for an entire storage medium.

103 Claims, 7 Drawing Sheets

Related U.S. Application Data 7,536,524, which is a continuation-in-part of application No. 10/600,540, filed on Jun. 23, 2003, now Pat. No. 7,076,624, which is a continuation of application No. 10/032,467, filed on Jan. 2, 2002, now Pat. No. 6,654,864, which is a division of application No. 09/267,787, filed on Mar. 15, 1999, now Pat. No. 6,336,175, said application No. 13/562,312 is a continuation-in-part of application No. 12/213,670, filed on Jun. 23, 2008, now Pat. No. 8,782,009, which is a division of application No. 09/665,065, filed on Sep. 19, 2000, now Pat. No. 7,392,234, which is a continuation-in-part of application No. 09/313,181, filed on May 18, 1999, now Pat. No. 6,438,642.

(56) References Cited

U.S. PATENT DOCUMENTS

| | | |
|---|---|---|
| 4,686,620 A | 8/1987 | Ng |
| 4,701,848 A | 10/1987 | Clyde |
| 4,757,533 A | 7/1988 | Allen et al. |
| 4,776,537 A | 10/1988 | Garside et al. |
| 4,825,354 A | 4/1989 | Agrawal et al. |
| 4,887,204 A | 12/1989 | Johnson et al. |
| 4,888,798 A | 12/1989 | Earnest |
| 4,890,223 A | 12/1989 | Cruess et al. |
| 4,914,571 A | 4/1990 | Baratz et al. |
| 4,947,318 A | 8/1990 | Mineo et al. |
| 4,958,314 A | 9/1990 | Imai et al. |
| 4,975,898 A | 12/1990 | Yoshida |
| 4,989,206 A | 1/1991 | Dunphy, Jr. et al. |
| 4,993,030 A | 2/1991 | Krakauer |
| 5,008,853 A | 4/1991 | Bly |
| 5,029,199 A | 7/1991 | Jones et al. |
| 5,050,212 A | 9/1991 | Dyson |
| 5,089,958 A | 2/1992 | Horton et al. |
| 5,095,423 A | 3/1992 | Gramlich et al. |
| 5,103,476 A | 4/1992 | Waite et al. |
| 5,157,663 A | 10/1992 | Major et al. |
| 5,163,147 A | 11/1992 | Orita |
| 5,182,770 A | 1/1993 | Medveczky et al. |
| 5,193,154 A | 3/1993 | Kitajima et al. |
| 5,193,184 A | 3/1993 | Belsan et al. |
| 5,206,951 A | 4/1993 | Khoyi |
| 5,214,627 A | 5/1993 | Nakashima et al. |
| 5,222,242 A | 6/1993 | Choi et al. |
| 5,237,661 A | 8/1993 | Kawamura et al. |
| 5,241,668 A | 8/1993 | Eastridge et al. |
| 5,241,670 A | 8/1993 | Eastridge et al. |
| 5,247,660 A | 9/1993 | Ashcraft et al. |
| 5,247,681 A | 9/1993 | Janis et al. |
| 5,276,867 A | 1/1994 | Kenley et al. |
| 5,287,504 A | 2/1994 | Carpenter et al. |
| 5,313,631 A | 5/1994 | Kao |
| 5,317,728 A | 5/1994 | Tevis et al. |
| 5,325,532 A | 6/1994 | Crosswy et al. |
| 5,333,315 A | 7/1994 | Saether et al. |
| 5,347,628 A | 9/1994 | Brewer et al. |
| 5,347,653 A | 9/1994 | Flynn et al. |
| 5,367,698 A | 11/1994 | Webber et al. |
| 5,369,770 A | 11/1994 | Thomason et al. |
| 5,377,323 A | 12/1994 | Vasudevan |
| 5,379,423 A | 1/1995 | Mutoh et al. |
| 5,408,630 A | 4/1995 | Moss |
| 5,410,700 A | 4/1995 | Fecteau et al. |
| 5,412,808 A | 5/1995 | Bauer |
| 5,416,842 A | 5/1995 | Aziz |
| 5,425,028 A | 6/1995 | Britton et al. |
| 5,432,851 A | 7/1995 | Scheidt et al. |
| 5,434,562 A | 7/1995 | Reardon |
| 5,434,974 A | 7/1995 | Loucks et al. |
| 5,450,576 A | 9/1995 | Kennedy |
| 5,455,926 A | 10/1995 | Keele |
| 5,493,607 A | 2/1996 | Arumainayagam et al. |
| 5,495,533 A | 2/1996 | Linehan et al. |
| 5,495,619 A | 2/1996 | May et al. |
| 5,497,484 A | 3/1996 | Potter et al. |
| 5,509,120 A | 4/1996 | Merkin |
| 5,513,314 A | 4/1996 | Kandasamy et al. |
| 5,519,833 A | 5/1996 | Agranat et al. |
| 5,530,757 A | 6/1996 | Krawczyk |
| 5,537,636 A | 7/1996 | Uchida et al. |
| 5,542,045 A | 7/1996 | Levine |
| 5,544,347 A | 8/1996 | Yanai et al. |
| 5,548,521 A | 8/1996 | Krayer |
| 5,548,532 A | 8/1996 | Menand et al. |
| 5,548,646 A | 8/1996 | Aziz et al. |
| 5,559,957 A | 9/1996 | Balk |
| 5,559,991 A | 9/1996 | Kanfi |
| 5,564,011 A | 10/1996 | Yammine et al. |
| 5,564,054 A | 10/1996 | Bramnick et al. |
| 5,572,675 A | 11/1996 | Bergler et al. |
| 5,574,952 A | 11/1996 | Brady et al. |
| 5,579,507 A | 11/1996 | Arai et al. |
| 5,584,008 A | 12/1996 | Shimada et al. |
| 5,592,683 A | 1/1997 | Chen et al. |
| 5,594,863 A | 1/1997 | Stiles |
| 5,596,711 A | 1/1997 | Burckhartt et al. |
| 5,596,755 A | 1/1997 | Pletcher et al. |
| 5,606,609 A | 2/1997 | Houser et al. |
| 5,615,392 A | 3/1997 | Harrison et al. |
| 5,623,601 A | 4/1997 | Vu |
| 5,625,693 A | 4/1997 | Rohatgi et al. |
| 5,630,076 A | 5/1997 | Saulpaugh et al. |
| 5,638,509 A | 6/1997 | Dunphy et al. |
| 5,642,496 A | 6/1997 | Kanfi |
| 5,644,766 A | 7/1997 | Cabrera et al. |
| 5,649,095 A | 7/1997 | Cozza |
| 5,652,913 A | 7/1997 | Crick et al. |
| 5,661,848 A | 8/1997 | Bonke et al. |
| 5,668,958 A | 9/1997 | Bendert et al. |
| 5,671,442 A | 9/1997 | Feeney et al. |
| 5,675,723 A | 10/1997 | Ekrot et al. |
| 5,675,787 A | 10/1997 | Miller et al. |
| 5,678,014 A | 10/1997 | Malamud et al. |
| 5,682,513 A | 10/1997 | Candelaria et al. |
| 5,687,343 A | 11/1997 | Fecteau et al. |
| 5,689,662 A | 11/1997 | Nakajima et al. |
| 5,689,700 A | 11/1997 | Miller et al. |
| 5,696,895 A | 12/1997 | Hemphill et al. |
| 5,701,462 A | 12/1997 | Whitney et al. |
| 5,708,650 A | 1/1998 | Nakashima et al. |
| 5,708,776 A | 1/1998 | Kikinis |
| 5,710,930 A | 1/1998 | Laney et al. |
| 5,717,683 A | 2/1998 | Yoshimoto et al. |
| 5,729,743 A | 3/1998 | Squibb |
| 5,737,747 A | 4/1998 | Vishlitzky et al. |
| 5,748,736 A | 5/1998 | Mittra |
| 5,751,287 A | 5/1998 | Hahn |
| 5,751,997 A | 5/1998 | Kullick et al. |
| 5,758,359 A | 5/1998 | Saxon |
| 5,761,677 A | 6/1998 | Senator et al. |
| 5,765,151 A | 6/1998 | Senator |
| 5,768,532 A | 6/1998 | Megerian |
| 5,771,354 A | 6/1998 | Crawford |
| 5,778,168 A | 7/1998 | Fuller |
| 5,778,365 A | 7/1998 | Nishiyama et al. |
| 5,778,384 A | 7/1998 | Provino et al. |
| 5,781,633 A | 7/1998 | Tribble et al. |
| 5,781,797 A | 7/1998 | Crick et al. |
| 5,793,970 A | 8/1998 | Fakes et al. |
| 5,799,088 A | 8/1998 | Raike |
| 5,802,080 A | 9/1998 | Westby |
| 5,813,009 A | 9/1998 | Johnson et al. |
| 5,813,017 A | 9/1998 | Morris |
| 5,825,728 A | 10/1998 | Yoshimoto et al. |
| 5,828,893 A | 10/1998 | Wied et al. |
| 5,832,522 A | 11/1998 | Blickenstaff et al. |
| 5,838,326 A | 11/1998 | Card et al. |
| 5,842,214 A | 11/1998 | Whitney et al. |
| 5,850,566 A | 12/1998 | Solan et al. |
| 5,854,759 A | 12/1998 | Kaliski, Jr. et al. |
| 5,862,331 A | 1/1999 | Herriot |

(56) References Cited

U.S. PATENT DOCUMENTS

| | | |
|---|---|---|
| 5,881,229 A | 3/1999 | Singh et al. |
| 5,884,033 A | 3/1999 | Duvall et al. |
| 5,893,139 A | 4/1999 | Kamiyama |
| 5,901,327 A | 5/1999 | Ofek |
| 5,909,540 A | 6/1999 | Carter et al. |
| 5,918,229 A | 6/1999 | Davis et al. |
| 5,919,257 A | 7/1999 | Trostle |
| 5,922,072 A | 7/1999 | Hutchinson et al. |
| 5,923,848 A | 7/1999 | Goodhand et al. |
| 5,924,102 A | 7/1999 | Perks |
| 5,925,126 A | 7/1999 | Hsieh |
| 5,931,935 A | 8/1999 | Cabrera et al. |
| 5,936,624 A | 8/1999 | Lisle et al. |
| 5,946,685 A | 8/1999 | Cramer et al. |
| 5,949,601 A | 9/1999 | Braithwaite et al. |
| 5,950,203 A | 9/1999 | Stakuis |
| 5,956,475 A | 9/1999 | Burckhartt et al. |
| 5,956,481 A | 9/1999 | Walsh et al. |
| 5,969,720 A | 10/1999 | Lisle et al. |
| 5,974,546 A | 10/1999 | Anderson |
| 5,974,549 A | 10/1999 | Golan |
| 5,978,815 A | 11/1999 | Cabrera |
| 5,978,914 A | 11/1999 | Carley et al. |
| 5,987,478 A | 11/1999 | See et al. |
| 5,987,506 A | 11/1999 | Carter et al. |
| 5,987,610 A | 11/1999 | Franczek |
| 5,991,753 A | 11/1999 | Wilde |
| 5,991,777 A | 11/1999 | Momoh et al. |
| 6,000,009 A | 12/1999 | Brady |
| 6,000,032 A | 12/1999 | Millard |
| 6,014,744 A | 1/2000 | McKaughan et al. |
| 6,014,767 A | 1/2000 | Glaise |
| 6,021,415 A | 2/2000 | Cannon et al. |
| 6,023,744 A | 2/2000 | Shoroff et al. |
| 6,026,402 A | 2/2000 | Vossen et al. |
| 6,032,216 A | 2/2000 | Schmuck et al. |
| 6,044,373 A | 3/2000 | Gladney et al. |
| 6,048,090 A | 4/2000 | Zook |
| 6,061,788 A | 5/2000 | Reynaud et al. |
| 6,076,148 A | 6/2000 | Kedem et al. |
| 6,078,990 A | 6/2000 | Frazier |
| 6,079,016 A | 6/2000 | Park |
| 6,088,803 A | 7/2000 | Bakshi et al. |
| 6,091,409 A | 7/2000 | Dickman et al. |
| 6,092,163 A | 7/2000 | Kyler et al. |
| 6,098,158 A | 8/2000 | Lay et al. |
| 6,101,506 A | 8/2000 | Ukai et al. |
| 6,101,601 A | 8/2000 | Matthews et al. |
| 6,105,122 A | 8/2000 | Muller et al. |
| 6,119,165 A * | 9/2000 | Li et al. ............ 709/229 |
| 6,141,754 A | 10/2000 | Choy |
| 6,148,369 A | 11/2000 | Ofer et al. |
| 6,148,412 A | 11/2000 | Cannon et al. |
| 6,154,787 A | 11/2000 | Urevig et al. |
| 6,161,111 A | 12/2000 | Mutalik et al. |
| 6,161,139 A | 12/2000 | Win et al. |
| 6,163,856 A | 12/2000 | Dion et al. |
| 6,167,402 A | 12/2000 | Yeager |
| 6,173,417 B1 | 1/2001 | Merrill |
| 6,185,661 B1 | 2/2001 | Ofek et al. |
| 6,195,650 B1 | 2/2001 | Gaither et al. |
| 6,240,414 B1 | 5/2001 | Beizer et al. |
| 6,240,421 B1 | 5/2001 | Stolarz ............ 707/102 |
| 6,249,866 B1 | 6/2001 | Brundrett |
| 6,256,031 B1 | 7/2001 | Meijer et al. |
| 6,266,679 B1 | 7/2001 | Szalwinski et al. ........ 707/204 |
| 6,266,774 B1 | 7/2001 | Sampath et al. |
| 6,266,785 B1 | 7/2001 | McDowell |
| 6,269,382 B1 | 7/2001 | Cabrera et al. |
| 6,269,431 B1 | 7/2001 | Dunham |
| 6,275,953 B1 | 8/2001 | Vahalia et al. |
| 6,286,087 B1 | 9/2001 | Ito et al. |
| 6,292,844 B1 | 9/2001 | Smyers et al. |
| 6,301,592 B1 | 10/2001 | Aoyama et al. |
| 6,317,875 B1 | 11/2001 | Grimsrud et al. |
| 6,324,581 B1 | 11/2001 | Xu et al. |
| 6,330,570 B1 | 12/2001 | Crighton et al. |
| 6,336,175 B1 | 1/2002 | Shaath et al. |
| 6,336,187 B1 | 1/2002 | Kern et al. |
| 6,343,324 B1 | 1/2002 | Hubis et al. |
| 6,345,299 B2 | 2/2002 | Segal |
| 6,349,294 B1 | 2/2002 | Shaath et al. |
| 6,349,313 B1 | 2/2002 | Momoh et al. |
| 6,356,915 B1 | 3/2002 | Chtchetkine |
| 6,363,400 B1 | 3/2002 | Chtchetkine et al. |
| 6,366,987 B1 | 4/2002 | Tzelnic et al. ............ 711/162 |
| 6,366,988 B1 | 4/2002 | Skiba |
| 6,370,545 B1 | 4/2002 | Shaath |
| 6,374,327 B2 | 4/2002 | Sakaki et al. |
| 6,381,619 B1 | 4/2002 | Borowsky et al. |
| 6,389,432 B1 | 5/2002 | Pothapragada et al. |
| 6,393,560 B1 | 5/2002 | Merrill et al. |
| 6,415,280 B1 | 7/2002 | Farber et al. ............ 707/698 |
| 6,438,642 B1 | 8/2002 | Shaath ............ 711/100 |
| 6,453,345 B2 | 9/2002 | Trcka et al. |
| 6,453,353 B1 | 9/2002 | Win et al. |
| 6,480,962 B1 | 11/2002 | Touboul |
| 6,487,561 B1 | 11/2002 | Ofek et al. |
| 6,487,644 B1 | 11/2002 | Huebsch et al. |
| 6,542,972 B2 | 4/2003 | Ignatius et al. |
| 6,546,384 B2 | 4/2003 | Shaath |
| 6,546,482 B1 | 4/2003 | Magro et al. |
| 6,564,228 B1 | 5/2003 | O'Connor |
| 6,577,920 B1 | 6/2003 | Hyppnen |
| 6,581,020 B1 | 6/2003 | Buote et al. |
| 6,581,143 B2 | 6/2003 | Gagne et al. |
| 6,594,675 B1 | 7/2003 | Schneider |
| 6,647,393 B1 | 11/2003 | Dietterich et al. |
| 6,654,830 B1 | 11/2003 | Taylor et al. |
| 6,654,864 B2 | 11/2003 | Shaath et al. |
| 6,658,436 B2 | 12/2003 | Oshinsky et al. |
| 6,658,526 B2 | 12/2003 | Nguyen et al. |
| 6,681,198 B2 | 1/2004 | Buote et al. |
| 6,681,230 B1 | 1/2004 | Blott et al. |
| 6,697,846 B1 | 2/2004 | Soltis |
| 6,714,513 B1 | 3/2004 | Joiner et al. |
| 6,728,884 B1 | 4/2004 | Lim |
| 6,732,124 B1 | 5/2004 | Koseki et al. |
| 6,745,207 B2 | 6/2004 | Reuter et al. |
| 6,748,504 B2 | 6/2004 | Sawdon et al. |
| 6,751,635 B1 | 6/2004 | Chen et al. |
| 6,754,696 B1 | 6/2004 | Kamath et al. |
| 6,754,705 B2 | 6/2004 | Joiner et al. |
| 6,778,346 B2 | 8/2004 | Takayama et al. |
| 6,789,117 B1 | 9/2004 | Joiner et al. |
| 6,801,902 B1 | 10/2004 | David |
| 6,820,136 B1 | 11/2004 | Pham et al. |
| 6,845,431 B2 | 1/2005 | Camble et al. |
| 6,847,968 B2 | 1/2005 | Pitts |
| 6,892,211 B2 | 5/2005 | Hitz et al. |
| 6,892,227 B1 | 5/2005 | Elwell et al. |
| 6,892,264 B2 | 5/2005 | Lamb |
| 6,898,617 B2 | 5/2005 | Doolittle et al. |
| 6,941,358 B1 | 9/2005 | Joiner et al. |
| 6,950,723 B2 | 9/2005 | Gallo et al. |
| 6,959,320 B2 | 10/2005 | Shah et al. |
| 6,971,018 B1 | 11/2005 | Witt |
| 6,985,325 B2 | 1/2006 | Bickers et al. |
| 6,993,603 B2 | 1/2006 | Pudipeddi et al. |
| 7,007,048 B1 | 2/2006 | Murray et al. |
| 7,017,016 B2 | 3/2006 | Chujo et al. |
| 7,024,427 B2 | 4/2006 | Bobbitt et al. |
| 7,032,222 B1 | 4/2006 | Karp et al. |
| 7,051,050 B2 | 5/2006 | Chen et al. |
| 7,054,927 B2 | 5/2006 | Ulrich et al. |
| 7,058,772 B2 | 6/2006 | Kuwabara et al. |
| 7,062,783 B1 | 6/2006 | Joiner |
| 7,065,538 B2 | 6/2006 | Aronoff et al. |
| 7,069,380 B2 | 6/2006 | Ogawa et al. |
| 7,073,059 B2 | 7/2006 | Worely, Jr. et al. |
| 7,076,624 B2 | 7/2006 | Shaath et al. |
| 7,092,839 B2 | 8/2006 | Buote et al. |
| 7,113,948 B2 | 9/2006 | Jhingan et al. |
| 7,143,116 B2 | 11/2006 | Okitsu et al. |

(56) References Cited

U.S. PATENT DOCUMENTS

| | | |
|---|---|---|
| 7,152,242 B2 | 12/2006 | Douglas |
| 7,154,857 B1 | 12/2006 | Joiner et al. |
| 7,155,466 B2 | 12/2006 | Rodriguez et al. |
| 7,171,532 B2 | 1/2007 | Kodama |
| 7,185,028 B2 | 2/2007 | Lechner |
| 7,216,366 B1 | 5/2007 | Raz et al. |
| 7,233,959 B2 | 6/2007 | Kanellos et al. |
| 7,246,207 B2 | 7/2007 | Kottomtharayil et al. |
| 7,254,588 B2 | 8/2007 | Sung et al. .................. 707/769 |
| 7,287,053 B2 | 10/2007 | Bodin |
| 7,292,993 B2 | 11/2007 | Uzzo et al. |
| 7,293,131 B2 | 11/2007 | Ogawa et al. |
| 7,308,544 B2 | 12/2007 | Kuwabara et al. |
| 7,313,633 B2 | 12/2007 | Beverly |
| 7,325,017 B2 | 1/2008 | Tormasov et al. |
| 7,380,064 B2 | 5/2008 | Ishii et al. |
| 7,392,234 B2 | 6/2008 | Shaath |
| 7,401,082 B2 | 7/2008 | Keene et al. |
| 7,401,229 B2 | 7/2008 | Ishidoshiro |
| 7,437,387 B2 | 10/2008 | Cohen et al. |
| 7,444,317 B2 | 10/2008 | Pudipeddi et al. |
| 7,451,435 B2 | 11/2008 | Hunt et al. |
| 7,478,431 B1 | 1/2009 | Nachenberg |
| 7,493,646 B2 | 2/2009 | Ellis |
| 7,505,980 B2 | 3/2009 | Tyndall |
| 7,512,578 B2 | 3/2009 | Abnous et al. |
| 7,519,783 B2 | 4/2009 | Kuwabara et al. |
| 7,529,903 B2 | 5/2009 | Boss et al. |
| 7,536,524 B2 * | 5/2009 | Shaath et al. ................ 711/163 |
| 7,552,300 B2 | 6/2009 | Man et al. |
| 7,584,190 B2 | 9/2009 | Lechner |
| 7,614,058 B2 | 11/2009 | Pan et al. |
| RE41,072 E | 1/2010 | Kyler et al. |
| 7,647,308 B2 | 1/2010 | Sallam |
| 7,651,593 B2 | 1/2010 | Prahlad et al. |
| 7,657,941 B1 | 2/2010 | Zaitsev |
| 7,660,946 B2 | 2/2010 | Watanabe et al. |
| 7,669,026 B2 | 2/2010 | Boss et al. |
| 7,735,100 B1 | 6/2010 | Sallam |
| 7,752,384 B2 | 7/2010 | Moody, II et al. |
| 7,779,425 B2 | 8/2010 | Pudipeddi et al. |
| 7,822,928 B2 | 10/2010 | Ishii et al. |
| 7,844,596 B2 | 11/2010 | Best et al. |
| 7,856,424 B2 | 12/2010 | Cisler et al. |
| 7,870,104 B2 | 1/2011 | Fujii et al. |
| 7,877,424 B2 | 1/2011 | Havewala et al. |
| 7,882,081 B2 | 2/2011 | Stager et al. |
| 7,912,866 B2 | 3/2011 | Borthakur et al. |
| 7,921,268 B2 | 4/2011 | Jakob |
| 7,930,493 B1 | 4/2011 | McGovern et al. |
| 7,930,495 B2 | 4/2011 | Bonwick et al. |
| 7,941,597 B2 | 5/2011 | Moody, II et al. |
| 7,953,701 B2 | 5/2011 | Okitsu et al. |
| 7,958,097 B1 | 6/2011 | Tormasov et al. |
| 7,971,019 B2 | 6/2011 | Tyndall et al. |
| 8,024,172 B2 | 9/2011 | Trimmer et al. |
| 8,055,645 B1 | 11/2011 | Sinha |
| 8,127,344 B2 | 2/2012 | Bugovics |
| 8,234,477 B2 * | 7/2012 | Shaath .......................... 711/163 |
| 8,290,808 B2 | 10/2012 | Brower, Jr. |
| 8,316,456 B2 | 11/2012 | Siukonen |
| 8,396,838 B2 | 3/2013 | Brockway et al. |
| 8,521,977 B2 | 8/2013 | Ueki et al. |
| 8,583,881 B1 | 11/2013 | Stuart |
| 8,612,395 B2 | 12/2013 | Saika |
| 8,874,935 B2 | 10/2014 | Basmov et al. |
| 9,043,898 B2 | 5/2015 | Chuen et al. |
| 9,129,111 B2 | 9/2015 | Rothwell |
| 2002/0004883 A1 | 1/2002 | Nguyen et al. |
| 2002/0030100 A1 | 3/2002 | Katayanagi et al. |
| 2002/0035696 A1 | 3/2002 | Thacker |
| 2002/0046320 A1 | 4/2002 | Shaath |
| 2002/0069214 A1 | 6/2002 | Smith et al. |
| 2002/0070971 A1 | 6/2002 | Brown et al. |
| 2002/0111956 A1 | 8/2002 | Yeo et al. |
| 2002/0174102 A1 | 11/2002 | Kyler |
| 2003/0039148 A1 | 2/2003 | Riedle |
| 2003/0046586 A1 | 3/2003 | Bheemarasetti et al. |
| 2003/0159070 A1 | 8/2003 | Mayer et al. |
| 2003/0177385 A1 | 9/2003 | Price et al. |
| 2003/0212913 A1 | 11/2003 | Vella |
| 2004/0010487 A1 | 1/2004 | Prahlad et al. |
| 2004/0064604 A1 | 4/2004 | Cox |
| 2004/0098244 A1 | 5/2004 | Dailey et al. |
| 2004/0107417 A1 | 6/2004 | Chia et al. |
| 2004/0111251 A1 | 6/2004 | Trimmer et al. |
| 2004/0111389 A1 | 6/2004 | Pudipeddi et al. |
| 2004/0125951 A1 | 7/2004 | Dunn et al. |
| 2004/0133608 A1 | 7/2004 | Kurt |
| 2004/0154040 A1 | 8/2004 | Ellis |
| 2004/0193760 A1 | 9/2004 | Matsunami et al. |
| 2005/0055211 A1 | 3/2005 | Claudatos et al. |
| 2005/0065961 A1 | 3/2005 | Aguren |
| 2005/0097143 A1 | 5/2005 | Pudipeddi |
| 2005/0108393 A1 | 5/2005 | Banerjee et al. |
| 2005/0114406 A1 | 5/2005 | Borthakur et al. |
| 2005/0119994 A1 | 6/2005 | Matsunami et al. |
| 2005/0144202 A1 | 6/2005 | Chen |
| 2005/0182910 A1 | 8/2005 | Stager et al. |
| 2005/0193173 A1 | 9/2005 | Ring et al. |
| 2005/0201297 A1 | 9/2005 | Peikari |
| 2005/0203964 A1 | 9/2005 | Matsunami et al. |
| 2005/0216762 A1 | 9/2005 | Peikari |
| 2005/0223242 A1 | 10/2005 | Nath |
| 2005/0223414 A1 | 10/2005 | Kenrich et al. |
| 2005/0229250 A1 | 10/2005 | Ring et al. |
| 2005/0240572 A1 | 10/2005 | Sung et al. |
| 2005/0240658 A1 | 10/2005 | Schulke |
| 2005/0246376 A1 | 11/2005 | Lu et al. |
| 2005/0246386 A1 | 11/2005 | Sullivan et al. |
| 2006/0004818 A1 | 1/2006 | Claudatos et al. |
| 2006/0004820 A1 | 1/2006 | Claudatos et al. |
| 2006/0004847 A1 | 1/2006 | Claudatos et al. |
| 2006/0004868 A1 | 1/2006 | Claudatos et al. |
| 2006/0010154 A1 | 1/2006 | Prahlad et al. |
| 2006/0010241 A1 | 1/2006 | Kudallur et al. |
| 2006/0020616 A1 | 1/2006 | Hardy et al. |
| 2006/0059172 A1 | 3/2006 | Devarakonda |
| 2006/0095514 A1 | 5/2006 | Wang et al. |
| 2006/0117063 A1 | 6/2006 | Havewala et al. |
| 2006/0136685 A1 | 6/2006 | Griv et al. |
| 2006/0149735 A1 | 7/2006 | DeBie et al. |
| 2006/0165002 A1 | 7/2006 | Hicks et al. |
| 2006/0174345 A1 | 8/2006 | Flanagan et al. |
| 2006/0179061 A1 | 8/2006 | D'Souza et al. |
| 2006/0190925 A1 | 8/2006 | Ishii et al. |
| 2006/0230086 A1 | 10/2006 | Devarakonda et al. |
| 2006/0230244 A1 | 10/2006 | Amarendran et al. |
| 2006/0245371 A1 | 11/2006 | Joiner et al. |
| 2006/0259901 A1 | 11/2006 | Kaplan |
| 2007/0022287 A1 | 1/2007 | Beck et al. |
| 2007/0055711 A1 | 3/2007 | Polyakov et al. |
| 2007/0055715 A1 | 3/2007 | Achiwa |
| 2007/0067844 A1 | 3/2007 | Williamson et al. |
| 2007/0079126 A1 | 4/2007 | Hsu et al. |
| 2007/0079178 A1 | 4/2007 | Gassoway |
| 2007/0094312 A1 | 4/2007 | Sim-Tang |
| 2007/0143371 A1 | 6/2007 | Kottomtharayil |
| 2007/0143756 A1 | 6/2007 | Gokhale |
| 2007/0180529 A1 | 8/2007 | Costea et al. |
| 2007/0183224 A1 | 8/2007 | Erofeev |
| 2007/0185934 A1 | 8/2007 | Cannon et al. |
| 2007/0260640 A1 | 11/2007 | Hamilton et al. |
| 2007/0261112 A1 | 11/2007 | Todd et al. |
| 2007/0271306 A1 | 11/2007 | Brown et al. |
| 2007/0271610 A1 | 11/2007 | Grobman |
| 2008/0002830 A1 | 1/2008 | Cherkasov et al. |
| 2008/0016571 A1 | 1/2008 | Chang |
| 2008/0043274 A1 | 2/2008 | Wang et al. |
| 2008/0046563 A1 | 2/2008 | Banerjee et al. |
| 2008/0060080 A1 | 3/2008 | Lim |
| 2008/0120465 A1 | 5/2008 | Brannon et al. |
| 2008/0133719 A1 | 6/2008 | Amitai et al. |

(56) References Cited

U.S. PATENT DOCUMENTS

| | | |
|---|---|---|
| 2009/0038011 A1 | 2/2009 | Nadathur |
| 2011/0238716 A1 | 9/2011 | Amir et al. |
| 2014/0330800 A1 | 11/2014 | Shaath |

FOREIGN PATENT DOCUMENTS

| | | | |
|---|---|---|---|
| WO | WO 00/58865 | 10/2000 | |
| WO | WO 0058865 A1 | 10/2000 | ............. G06F 17/30 |

OTHER PUBLICATIONS

DOCUMENTUM Launches EDMA 98, Jul. 1998, PR Newswire.
Schoeniger, Data pecking order, Jan. 1994, DEC Professional, vol. 13 No. 1, pp. 24-33.
Mangold, Greg, "Basic architecture of HSM sets it apart from backup", Computer Technology Review, Fall 1994, p. 58.
Uvelli, Dave, "The role of tape-based storage in Storage Area Networks", Computer Technology Review, Jun. 2000, p. 56.
Anonymous, "Daticon Systems unveils Dati-Share, Virtual Partner", Information Today, Feb. 1999, vol. 16, No. 2, p. 54.
J. Gable, "Records Management for Electronic Documents", ARMA Records Management Quarterly, vol. 31, No. 4, Oct. 1997, pp. 15-19.
The Gale Group, "Documentum Launches EDMA 98", PR Newswire, Jul. 1998.
E. Schoeniger, "Data pecking order," DEC Professional, vol. 13, No. 1, Jan. 1994, pp. 24-33.
Baird et al., "Distributed Information Storage Architecture", Mass Storage Systems, 1993; Putting All That Data to Work; Proceedings, Twelfth IEEE Symposium in Monterey, California, Apr. 26-29, 1993, Los Alamitos, California, IEEE Comput. Soc., US; Apr. 26, 1993, pp. 145-155.
Foster et al., "Renaissance: managing the network computer and its storage requirements", Proceedings of the Symposium on Mass Storage Systems, Monterey, California, Oct. 7-10, 1991, Los Alamitos, IEEE Comp. Soc. Press, US, vol. SYMP. 11, Oct. 7, 1991, pp. 3-10.
Bedoll el al., "The importance of metadata in mass-storage systems", Mass Storage Systems, 1990, Crisis in Mass Storage. Digest of Papers; Tenth IEEE Symposium in Monterey, CA, May 7-10, 1990, Washington, DC, USA, IEEE Comput. Soc. PR, US, May 7, 1990, pp. 111-116.
Lanzatella, et al., "Storage Management Issues for Cray Research," Mass Storage Systems, 1990, Crisis in Mass Storage; Digest of Papers; Tenth IEEE Symposium on Monterey, CA, USA, May 7-10, 1990, Washington DC, USA, IEEE Comput. Soc. PR, US, May 7, 1990, pp. 176-181.
J. Gait, "The Optical File Cabinet: A Random-Access File System for Write Once Optical Disks," Computer, Jun. 1988, pp. 11-22.
J. Gait, "Phoenix: A Safe In-Memory File System," Communications of ACM, vol. 33, No. 1, Jan. 1990, pp. 81-86.
J. Gait, "A Checkpointing Page Store for Write-Once Optical Disk," IEEE Transactions on Computers, vol. 39, No. 1, Jan. 1990, pp. 2-9.
T. Laskodi et al., "A UNIX File System for a Write-Once Optical Disc," Summer USENIX '88, San Francisco, Jun. 20-24, pp. 51-60.
G. Mangold, "Basic architecture of HSM sets it apart from backup", Computer Technology Review, Fall 1994, p. 58.
D. Uvelli, "The role of tape-based storage in Storage Area Networks", Computer Technology Review, Jun. 2000, p. 56.
Anonymous, "Daticon Systems unveils Dati-Share, Virtual Partner", Information Today, vol. 16, No. 2, Feb. 1999, p. 54.
P. Druschel and A. Rowstron, "PAST: A Large-Scale, Persistent Peer-to-Peer Storage Utility", date: after Nov. 2001.
Baker, Steven, New and Improved: NIS+ (Sun Microsystems Inc.'s Network Information Service+) (New worth) (Cohirnn); UNIX Review, vol. 11, No. 1, pp. 21-27; Jan. 1993.
Cabrera, Luis Felipe, et al., "QuickSilver Distributed Files Services: An Architecture for Horizontal Growth," 2nd IEEE Conference on Computer Workstations, Santa Clara, CA; Mar. 7-10, 1988; pp. 23-37.
Davies, D.W., et al., "Distributed System Architecture Model," Chapter 2; Lecture Notes in Computer Science: Distributed Systems—Architecture and Implementation; pp. 10-43; 1981.
Guy, Richard G., et al, "Name Transparency in Very Large Scale Distributed File System," Proceedings of IEEE Workshop on Experimental Distributed Systems, pp. 20-25; 1990.
Kistler, James J., and Satyanarayanan, M; "Disconnected Operation in a Coda File System," pp. 213-225; 1991.
Oustenhout, John K. et al, "The Sprite Network Operating System," Computer; vol. 21 (2); Feb. 1, 1988; pp. 23-36.
Page, Thomas W., Jr., et al; "Management of Replicated Volume Location Data in the Focus Replicated File System," USENIX Conference Proceedings, pp. 17-29; Summer 1991.
Robinson, D.C., and Sloman, M.S., Domains: A New Approach to Distributed System Management; IEEE; pp. 154-163; 1988.
Satyanarayanan, M; "Distributed File System," Chapter 9; Distributed Systems; pp. 149-188; 1989.
Satyanarayanan, Mahadev, "Scalable, Secure, and Highly Available Distributed File Access," Computer, pp. 9-20; May 1990.
Spector, Alfred Z.; "Thoughts on Large Distributed Filed Systems," Proceedings of the German National Computer Conference; pp. 1-10; Oct. 1986.
Satyanarayanan, Mahadev, "Coda: A Highly Available File System for a Distributed Workstation Environment," IEEE; pp. 447-459; Apr. 1990.
Sidebotham, Bob, "Volumes—The Andrew File System Data Structuring Primitives," Proceedings of EUGG Autumn '86; pp. 473-480; Sep. 1986.
Wedde, et al., "Distributed Management of Replicated and Partitioned Files Under Dragon Slayer," The Fourteenth Annual International Computer Software & applications Conference, Chicago, Illinois; Oct. 31-Nov. 2, 1990; pp. 436-441.
"Uniting File Systems," UNIX Review, vol. 7, No. 3; pp. 61-70 date unknown.
Walker, Bruce, et al, "The Locus Distributed Operating System," ACM Operating System Review; vol. 17, No. 5; pp. 49-70; 1983.
Welch, Brent, and John Ousterhout, "Prefix Tables: A Simple Mechanism for Locating Files in a Distributed System," The 6th International Conference on Distributed Computing Systems, Cambridge, Massachusetts; May 19-23, 1986; pp. 184-189.
Welch, Brent, and Ousterhout, John; "Prefix Tables; A Simple Mechanism for Locating files in a Distributed System," Proceedings of the IEEE Sixth Conference Distributed Computing Systems, pp. 184-189; May 1986.
Wedde et al., "Distributed Management of Replicated and Partitioned Files Under Dragon Slayer," The Fourteenth Annual International Computer Software & Applications Conference, Chicago, Illinois; 1990, pp. 436-441.
Yeo et al., "A Taxonomy of issues in Name Systems Design and Implementation," Operating Systems Review; vol. 27(3), Jul. 1993, pp. 4-18.
Harry, Michael, Del Rosario, Juan Miguel, Choudhary, Alok, "VIP-FS: A Virtual, Parallel File System for High Performance Parallel and Distributed Computing," Proceedings of the 9th International Parallel Processing Sympsosium (IPPS'95), IEEE,1995.
Gable, "Records Management for Electronic Documents", ARMA Records Management Quarterly, vol. 31, No. 4, Oct. 1997, pp. 15-19.
Schoeniger, "Data pecking order," DEC Professional, vol. 13, No. 1, Jan. 1994, pp. 24-33.
Baird et al., "Distributed Information Storage Architecture", Mass Storage Systems, 1993, Putting All That Data to Work; Proceedings, Twelfth IEEE Symposium in Monterey, California, Apr. 26-29, 1993, Los Alamitos, California, IEEE Comput. Soc., US, Apr. 26, 1993, pp. 145-155.
Foster et al., "Renaissance: managing the network computer and its storage requirements", Proceedings of the Symposium on Mass Storage Systems, Monterey, Oct. 7-10, 1991; Los Alamitos, IEEE Comp. Soc. Press, US, vol. SYMP. 11, Oct. 7, 1991; pp. 3-10.
Bedoll el al., "The importance of metadata in mass-storage systems", Mass Storage Systems, 1990, Crisis in Mass Storage. Digest of Papers; Tenth IEEE Symposium in Monterey, California, May 7-10,

(56) References Cited

OTHER PUBLICATIONS

1990, Washington, DC, USA; IEEE Comput. Soc. PR, US, May 7, 1990, pp. 111-116.

Lanzatella, et al., "Storage Management Issues for Cray Research," Mass Storage Systems, 1990, Crisis in Mass Storage. Digest of Papers; Tenth IEEE Symposium in Monterey, California, May 7-10, 1990, Washington DC, USA; IEEE Comput. Soc. PR, US, May 7, 1990, pp. 176-181.

Edjlali, Guy, Acharya, Anurag, and Chaudhary, Vipin, "History-based Access Control for Mobile Code," CCS'98 Proceedings of the 5th ACM conference on Computer and Communications Security, ACM, NY, NY, 1998.

Harry, Michael, Del Rosario, Juan Miguel, Choudhary, Alok, "VIP-FS: A Virtual, Parallel File System for High Performance Parallel and Distributed Computing," Proceedings of the 9th International Parallel Processing Sympsosium (IPPS'95), IEEE, 1995.

"Filtering File Systems—Then Things You Should Know," The NT Insider, vol. 16, Issue 1, Jan-Feb 2009, Published: Mar. 9, 2009, Modified: Mar. 9, 2009.

"File Systems, File System Filter Drivers and Removable Storage Devices," The NT Insider, vol. 16, Issue 2, May-Jun. 2009, Published: Jun. 8, 2009, Modified: Jun. 8, 2009.

"File Systems and Filters: A Specialty," OSR Staff, Published: Aug. 6, 2010, Modified: Aug. 6, 2010.

"How Are Files Deleted in Windows," OSR Staff, Published: Jun. 20, 2003, Modified: Jun. 20, 2003.

"One Special Case—Testing File Systems," The NT Insider, vol. 11, Issue 3 & 4, May-Aug. 2004, Published: Aug. 18, 2004, Modified: Aug. 18, 2004.

"Stand Up and be Recognized-File System Recognizers," The NT Insider, vol. 4, Issue 5, Sep.-Oct. 1997, Published: Oct. 15, 1997, Modified Aug. 22, 2002.

"Windows NT File System Internals, File System Internals," 1st Edition, Sep. 11, 1997, 1st Ed., pp. 615-625.

"Writing Filters is Hard Work: Undocumented DFS & RDR Interactions," The NT Insider, vol. 17, Issue 2 , Jul.-Aug. Aug. 2010, Published: Aug. 5, 2010, Modified: Aug. 5, 2010.

"McAffee Delivers Real-Time Virus Scanning for Windows NT Server and Windows NT Workstation," The Free Library, 1996 Business Wire, Mar. 19, 1996.

\* cited by examiner

METHOD AND SYSTEM FOR PROVIDING RESTRICTED ACCESS TO A STORAGE MEDIUM

CROSS-REFERENCE TO RELATED APPLICATIONS

This application is a Continuation-in-part of U.S. patent application Ser. No. 12/431,387, filed Apr. 28, 2009 entitled Method and System for Providing Restricted Access to a Storage Medium, which is a Continuation-in-part of U.S. patent application Ser. No. 11/482,115 filed on Jul. 7, 2006; which was a Continuation-in-part of U.S. patent application Ser. No. 10/600,540, now U.S. Pat. No. 7,076,624 issued Jul. 11, 2006; which was a Continuation application of U.S. patent application Ser. No. 10/032,467, now U.S. Pat. No. 6,654,864 issued Nov. 25, 2003; which was a Divisional application of U.S. patent application Ser. No. 09/267,787, now U.S. Pat. No. 6,336,175 issued Jan. 1, 2002; which claimed priority to Canadian Application 2,244,626 filed Jul. 31, 1998 and issued Jan. 31, 2000. The application is also a Continuation-in-part of U.S. patent application Ser. No. 12/213,670, filed Jun. 23, 2008, which is a Divisional of U.S. patent application Ser. No. 09/665,065, filed Sep. 19, 2000, itself a continuation-in-part of U.S. patent application Ser. No. 09/313,181, filed May 18, 1999. The contents of all of the foregoing, of which are incorporated herein by reference in their respective entireties.

BACKGROUND OF THE INVENTION

1. Field of the Invention

The present invention relates to data storage and more particularly to a method of providing restricted write access on a data storage medium.

2. Related Art

In the past, operating systems restricted file access based on three criteria. The first criterion relates to the physical limitations of the storage device. For example, a CD-ROM drive only provides read access and therefore is restricted to read-only operation. The second relates to limitations of the storage medium. For example, a CD is a read-only medium, a CDR is a read/write medium but when a CD is full, the writer becomes a read-only medium, and so forth. The third relates to file access privileges. For example, in the UNIX operating system a file is stored with a set of access privileges including read and write privileges. Some files are read only and others are read/write and so forth.

Unfortunately, these access privileges fail to adequately provide protection for archival storage devices such as magnetic tape or removable optical media.

An example of a popular operating system is Windows NT®. Using Windows NT®, device drivers are hidden from applications by a protected subsystem implementing a programming and user interface. Devices are visible to user-mode programs, which include protected subsystems, only as named file objects controlled by the operating system input/output (IO) manager. This architecture limits an amount of knowledge necessary to implement device drivers and applications. In order to provide reasonable performance, the two separated systems, device drivers and applications, operate independently.

For example, when a write operation is requested by an application, the request is made via a file object handle. The application does not actually communicate with the storage device nor does the device driver for that storage device communicate with the application. Each communicates with the operating system independently. Thus, when the write command is issued for writing data to a device, the data is stored in buffer memory while the destination device is being accessed. A successful completion status is provided to the application. When the destination storage device is available, the stored data is written to the destination storage device. When the storage device is unavailable or fails to support write operations, the data is not successfully written. An error message may result, but will not be directed toward the application since it is not known to the device driver or is inaccessible. For example, the application may have terminated before the error occurs. Alternatively, no error message results and when the buffer is flushed or when the system is rebooted, the data is lost. Neither of these results is acceptable in normal computer use.

Fortunately, most devices are easily verified as to their capabilities. Read only devices are known as well as are read/write devices. Because a CD-ROM drive never becomes a read/write device, it is easily managed. When a device supports both read/write media and read only media the problem becomes evident.

In order better to highlight the problem, an example is presented. When a hard disk is full, accessing a file results in updating of file information relating to a last access date and so forth, journaling. File access information is updated each time a file is retrieved. The information requires no extra memory within the hard disk and therefore, the status of the hard disk, full or available disk space, is unimportant since the new file access information overwrites previous file access information. Thus, the file system writes to storage media even when full, so long as the capability of doing so exists.

When an archive data store is used with a data store device, it is often desirable that it not be written to. Therefore, accessing a file requires that the file access information is not updated—journaling is not performed. Unfortunately, when the data store device is accessed via a read/write file object handle, updating of the file access information is performed by the file system. As such, the data store is altered even when this is not desired. Further, since a single data store device accepts any number of different data stores during a period of time when the file system is in continuous operation, it is impractical if not impossible to remount the data store device with a new data store device driver and a new file object handle whenever the read/write privileges change. Currently, there is no adequate solution to overcome this problem.

In an attempt to overcome these and other limitations of the prior art, it is an object of the present invention to provide a method of limiting access privileges for a storage medium that supports increased flexibility over those of the prior art.

BRIEF SUMMARY OF THE INVENTION

In accordance with the invention there is provided a method of providing restricted access to a storage medium in communication with a computer comprising the step of: executing a file system layer on the computer, the file system layer supporting a plurality of file system commands; executing a trap layer on the computer, the trap layer logically disposed above the file system layer; providing to the trap layer at least a disabled file system command relating to the storage medium and supported by the file system for the storage medium; intercepting data provided to the file system layer including an intercepted file system command; comparing the intercepted file system command to each of the at least a disabled file system command to produce at least a comparison result; and, when each of the at least a comparison result is indicative of other than a match, providing the intercepted file system command to the file system layer.

In some embodiments an application layer is in execution logically above the trap layer such that the trap layer is logically disposed between the application layer and the file system layer; and when a comparison result from the at least a comparison result is indicative of a match, providing an error indication to the application layer. Preferably, the error indication is provided from the trap layer.

In accordance with the invention there is further provided a method of restricting access to a storage medium in communication with a computer, the method comprising the step of: executing a file system layer on the computer, the file system layer supporting a plurality of file system commands; providing to the file system layer at least a disabled file system command for the storage medium, the disabled file system command supported by the file system for the storage medium, the at least a disabled file system command being other than all write commands, other than all read commands, and other than all write commands and all read commands; comparing file system commands provided to the file system layer to each of the at least a disabled file system command to produce at least a comparison result; and, when each of the at least a comparison result is indicative of other than a match, executing the file system command.

In an embodiment the method also comprises the following steps: providing an indication of a data write access privilege for the entire logical storage medium, the data write access privilege indicative of a restriction to alteration of a same portion of each file stored on the logical storage medium; and restricting file access to the logical storage medium in accordance with the indication while allowing access to free space portions of the same logical storage medium.

In accordance with the invention there is also provided a method of restricting access by a computer to a storage medium other than a write once medium in communication with the computer, the method comprising the steps of: providing an indication of a data write access privilege for the entire logical storage medium indicating a disabled operation relating to alteration of a portion of each file stored within the logical storage medium, the indication other than a read only indication; and, restricting file access to each file within the logical storage medium in accordance with the same indication while allowing access to free space portions of the same logical storage medium. In an embodiment the indication comprises at least one of the following: write access without delete, write access without rename; write access without overwrite, and write access without changing file access privileges.

In accordance with the invention there is also provided a method of restricting access by a computer to a storage medium other than a write once medium in communication with the computer, the method comprising the steps of: providing an indication of a data write access privilege for the entire logical storage medium indicating a disabled operation relating to alteration of data within the logical storage medium, the indication other than a read only indication, the disabled operations supported by the storage medium; and restricting write access to data within the logical storage medium in accordance with the same indication while allowing access to free space portions of the same logical storage medium. A logical storage medium consists of a single physical storage medium or a single partition within a storage medium. Typically a disabled operation relates to destruction of data stored within a storage medium. Operations of this type include delete file, overwrite file, and rename file.

The present invention is preferably applied to removable storage media and more preferably to optical storage media such as removable optical rewritable disks.

According to an exemplary aspect of the present invention, restricted write access privileges for data stored within a data storage medium are supported. Advantageously, access privileges of this type allow write access to storage media or data files but limit that access in certain respects. These restrictions permit some level of control over a storage medium while providing some write privileges. An exemplary embodiment of the present invention may include, in an exemplary embodiment, a method for applying an operation access privilege to a storage medium, comprising: associating an access privilege with at least a portion of the storage medium; intercepting an attempted operation on at least a portion of the storage medium, wherein intercepting occurs regardless of an identity of a user attempting the attempted operation; comparing the attempted operation to the access privilege; and allowing, or denying the attempted operation based on comparing the attempted operation to the access privilege.

According to an exemplary aspect of the present invention, the method may include allowing or denying occurs transparently to the user and transparently to a computer application invoking the attempted operation.

According to an exemplary aspect of the present invention, the method may include wherein the storage medium is a logical storage medium.

According to an exemplary aspect of the present invention, the method may include, wherein the logical storage medium comprises one or more logical portions.

According to an exemplary aspect of the present invention, the method wherein the associating an access privilege with at least a portion of the storage medium comprises associating at least one of an enabled operation or a restricted operation.

According to an exemplary aspect of the present invention, the method may include where the allowing or denying the attempted operation further comprises allowing the attempted operation when the attempted operation matches one of the enabled operations.

According to an exemplary aspect of the present invention, the method may include: passing the attempted operation to a file system containing the storage medium.

According to an exemplary aspect of the present invention, the method may include where wherein the allowing or denying the attempted operation further comprises: denying the attempted operation when the attempted operation matches one of the restricted operations.

According to an exemplary aspect of the present invention, the method may further include modifying the attempted operation when the attempted operation matches one of the restricted operations, if the attempted operation can be modified from a restricted operation to an enabled operation.

According to an exemplary aspect of the present invention, the method may include where the operation access privilege is read-only for the logical storage medium.

According to an exemplary aspect of the present invention, the method may include where the logical storage medium may include logical portions and the operation access privilege comprises multiple operation access privileges wherein any number of the operation access privileges can be associated with each logical portion.

According to an exemplary aspect of the present invention, the method may include where the operation access privileges comprise at least one of the following: read, write, execute, move, rename, append, change permissions, change attributes, overwrite and/or overwrite zero length.

According to an exemplary aspect of the present invention, the method may include where the intercepting may further include intercepting file input/output attempted operations.

According to an exemplary aspect of the present invention, the method may include where attempted operations may include at least one of adding, deleting, converting and/or modifying.

According to an exemplary aspect of the present invention, the method may include where, the intercepting further comprises intercepting one or more logical device input/output attempted operations.

A method for applying an operation access privilege between a computer and a storage medium, may include associating an access privilege with at least a portion of the storage medium; intercepting an attempted operation on at least a portion; comparing the attempted operation to the access privilege; and allowing or denying the attempted operation, wherein allowing or denying occurs regardless of an identity of a user attempting the attempted operation.

According to an exemplary aspect of the present invention, the method may include applying an operation access privilege to a logical storage medium, comprising: associating an access privilege with at least a logical portion of the logical storage medium; intercepting an attempted operation on at least a logical portion of the logical storage medium, wherein intercepting occurs regardless of an identity of a user attempting the attempted operation; comparing the attempted operation to the access privilege; and allowing, or denying the attempted operation.

According to an exemplary aspect of the present invention, a method for applying an operation access privilege between a computer and a logical storage medium, may include, associating an access privilege with at least a logical portion of the logical storage medium; intercepting an attempted operation on at least a logical portion; comparing the attempted operation to the access privilege; and allowing denying the attempted operation, wherein allowing or denying occurs regardless of an identity of a user attempting the attempted operation.

A method of applying an operation access privilege to a logical storage medium in a file system, comprising: providing an operation access privilege indicative of at least one of an enabled operation and/or a restricted operation to be performed on at least one portion of the logical storage medium; associating operation access privilege with at least one portion of the logical storage medium; intercepting in a trap layer an attempted operation on at least one portion; and passing attempted operation to the file system if the attempted operation matches the enabled operation.

According to an exemplary aspect of the present invention, the method may include where the method may include modifying the attempted operation if the attempted operation does not match the enabled operation or the attempted operation matches the restricted operation; and passing the modified attempted operate to the file system.

According to an exemplary aspect of the present invention, the method may include where the method may include, further comprising denying the attempted operation at the trap layer if the attempted operation matches the restricted operation.

According to an exemplary aspect of the present invention, the method may further include where denying the attempted operation at the trap layer if the attempted operation does not match the enabled operation.

According to an exemplary aspect of the present invention, the method may include where a method for applying an operation access privilege to a storage medium, comprising: associating an access privilege with at least a portion of the storage medium; intercepting an attempted operation on at least a portion of the storage medium; determining whether the attempted operation is an enabled operation or a restricted operation; and allowing or denying the attempted operation based on the determining whether the operation is an enabled operation or a restricted operation.

According to an exemplary aspect of the present invention, a method for applying operation access privilege to a logical storage medium based on file type, may comprise: defining a rule for a logical portion of the logical storage medium that comprises a data identifier and an access privilege; intercepting an attempted operation on the logical portion of the logical storage medium, wherein intercepting occurs regardless of an identity of a user attempting the attempted operation; comparing a data identifier associated with the attempted operation to the data identifier of the rule, and if matching, comparing the attempted operation to the access privilege; and allowing, or denying the attempted operation based on the comparing the attempted operation to the access privilege.

According to an exemplary aspect of the present invention, a data identifier may include a file type. According to an exemplary embodiment, the data identifier may include at least one of the following: a data path, a data mask, and/or a unique file identifier.

According to an exemplary aspect of the present invention, a method for applying an operation access privilege to a storage medium, may comprise: associating an access privilege with at least a portion of the storage medium; intercepting an attempted operation on at least a portion of the storage medium based on a data identifier associated with the attempted operation, wherein intercepting occurs regardless of an identity of a user attempting the attempted operation; comparing the attempted operation to the access privilege; and allowing, or denying the attempted operation based on the comparing the attempted operation to the access privilege.

According to an exemplary aspect of the present invention, the method may further include allowing, or denying the attempted operation based on a content of a logical file associated with at least a portion of the storage medium.

According to an exemplary aspect of the present invention, the method may further include allowing, or cancelling the attempted operation based on the content of the file.

According to an exemplary aspect of the present invention, allowing, or denying the attempted operation may include: (i) allowing a create file operation to create a file associated with at least a portion of the storage medium; (ii) evaluating the content of the file; and/or (iii) allowing, or deleting the file based on evaluating the file.

According to an exemplary aspect of the present invention, associating the access privilege may include associating the access privilege with at least a portion of the storage medium based on a file attribute of a logical file associated with at least a portion of the storage medium.

According to an exemplary aspect of the present invention, enforcing a retention policy may include preventing at least a portion of the storage medium in a retained state from being modified while a retention period of at least a portion of the storage medium is unexpired.

According to an exemplary aspect of the present invention, enforcing a retention policy may be enforced for at least one of: a file name, a file attribute, a file path, or a file content, of a logical file associated with at least a portion of the storage medium.

According to an exemplary aspect of the present invention, enforcing a retention policy may include determining if at least a portion of the storage medium is eligible to enter the retained state based on a content of at least a portion of the storage medium.

According to an exemplary aspect of the present invention, determining may include determining if at least a portion of the storage medium is eligible to enter the retained state based on a content group associated with at least a portion of the storage medium, the content group associated based on evaluating at least a portion of the storage medium for pre-defined content.

According to an exemplary aspect of the present invention, associating the access privilege may include holding the retained state.

According to an exemplary aspect of the present invention, holding the retained state may include at least one of: (i) suspending expiration of a retained state portion of the storage medium; (ii) suspending an unexpired retained state portion of the storage medium from entering an expired retained state; (iii) suspending clearing of a read only attribute of the retained state portion of the storage medium by setting a temporary attribute of the retained state portion of the storage medium; and/or (iv) suspending deletion of an expired retained state portion of the storage medium.

According to an exemplary aspect of the present invention, enforcing a retention policy may include triggering one or more background processes when at least a portion of the storage medium enters a retained state.

According to an exemplary aspect of the present invention, one or more background processes may include at least one of: (i) creating metadata for the retention; (ii) identifying the user retaining at least a portion of the storage medium; (iii) storing user identification for the user retaining at least a portion of the storage medium; (iv) identifying the retention policy retaining at least a portion of the storage medium; (v) storing the retention policy retaining at least a portion of the storage medium; (vi) generating a digital signature of the content of at least a portion of the storage medium; (vii) generating a digital signature comprising a hash of the content of at least a portion of the storage medium; (viii) generating a digital signature of the content of at least one of a default data stream associated with a file associated with at least a portion of the storage medium or one or more alternate data streams associated with the file associated with at least a portion of the storage medium; (ix) storing the digital signature; (x) determining if any other policies apply; (xi) creating at least one of an alternate data stream or an extended attribute to store the metadata; (xii) encrypting hash keys for the metadata; and/or (xiii) storing the hash keys.

According to an exemplary aspect of the present invention, enforcing the retention policy may include triggering retention of at least a portion of the storage medium based on at least one of: (i) the attempted operation; (ii) setting a read-only attribute of the file; (iii) renaming the file to a file name; (iv) renaming the file to a particular name; (v) resizing the file; (vi) resizing the file to a particular size; (vii) creating an extended attribute associated with the file; and/or (viii) creating an alternate data stream associated with the file.

According to an exemplary aspect of the present invention, enforcing the retention policy may include enforcing an archive policy including queuing at least a portion of the storage medium to be copied to an alternate media, when at least a portion of the storage medium is retained.

According to an exemplary aspect of the present invention, the method may further include forcing a secure erasure for a delete operation on at least a portion of the storage medium, wherein secure erasure comprises at least one of overwriting the content of at least a portion of the storage medium or overwriting an alternate data stream associated with at least a portion of the storage medium.

According to an exemplary aspect of the present invention, allowing, or denying may include at least one of: (i) allowing the operation on a directory if the directory is empty; and/or (ii) denying the operation on the directory if the directory is not empty.

According to an exemplary aspect of the present invention, allowing, or denying the attempted operation may be based on at least one of an application or a process attempting the attempted operation. According to an exemplary aspect of the present invention, allowing, or denying the attempted operation based on the application may include: (i) allowing the attempted operation for at least one of a named or a registered process; (ii) denying the attempted operation for at least one of the named or the registered process; and/or (iii) allowing the attempted operation for a privileged application, the privileged application comprising an application operable to be authenticated via a digital signature.

According to an exemplary aspect of the present invention, the method may further include enforcing a policy based on an application, the policy including at least one of: (i) enforcing application based intercepting of the attempted operation; (ii) disabling an operation option provided to the user; (iii) expanding the scope of an operation based on the application; and/or (iv) allowing, or denying the attempted operation based on validating a child object of a parent object of an attempted operation.

According to an exemplary aspect of the present invention, the method may further include enforcing a secure time routine, the routine including at least one of: (i) using a secure clock; (ii) maintaining a system clock comprising using the secure clock; (iii) accounting for deviations based on inaccuracies of the secure clock; (iv) verifying operation of a secure clock or authenticating the secure clock; (v) at least one of: denying at least one attempted operation, preventing at least a portion of the storage medium from being retained, or rendering the storage medium read-only, if the secure clock can not be at least one of: verified or authenticated; and/or (vi) running the secure clock independent of a server.

BRIEF DESCRIPTION OF THE DRAWINGS

Exemplary embodiments of the invention will now be described in conjunction with the drawings in which.

DETAILED DESCRIPTION OF THE INVENTION

Figure 1:
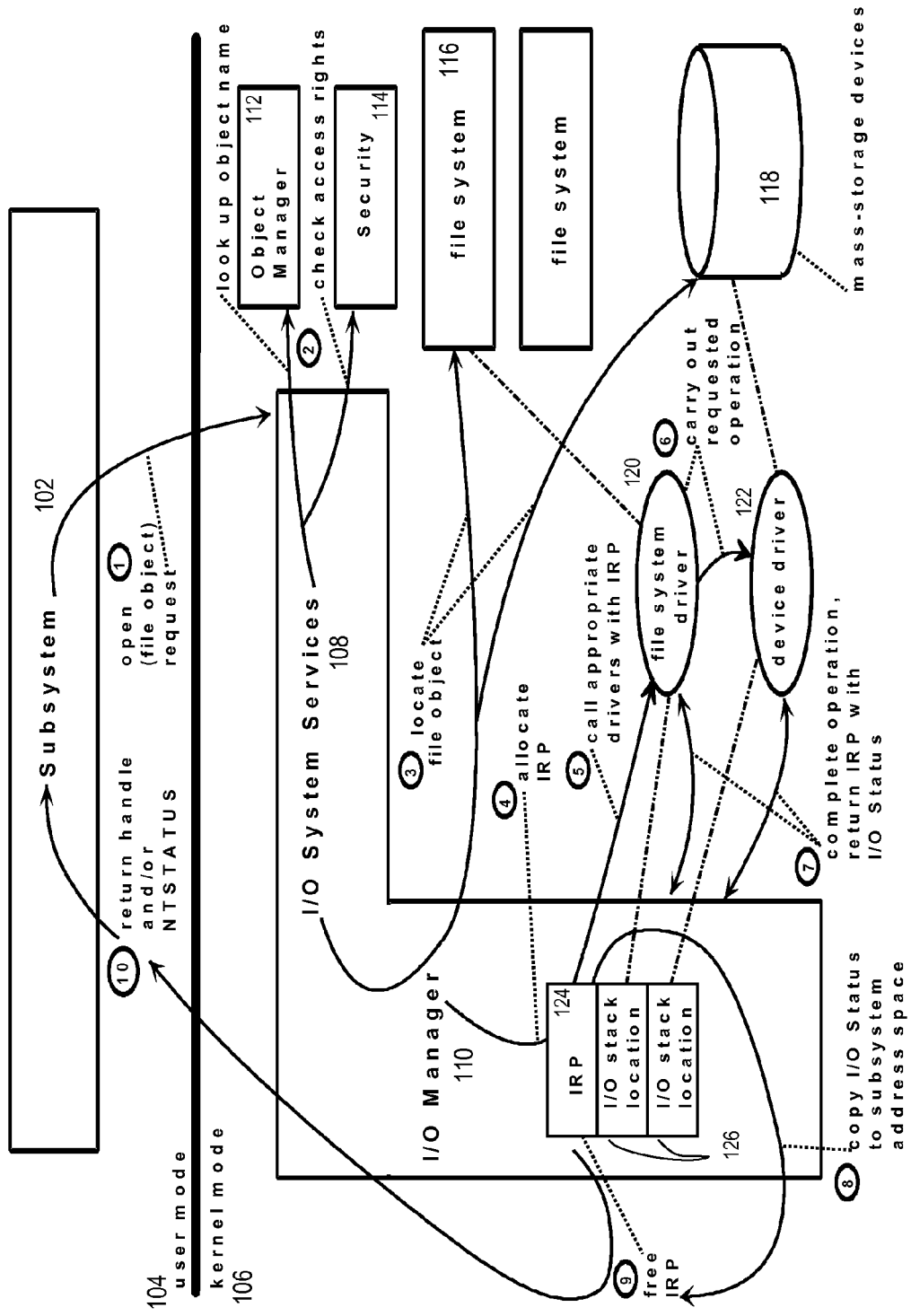
FIG. 1 is a simplified block diagram of an NT® operating system architecture during a process of opening a file is shown.

Referring to FIG. 1, an exemplary simplified block diagram of a Windows NT® (NT) operating system architecture during a process of opening a file is shown, though the present embodiments may be applied to any other operating system. In the exemplary embodiment, NT drivers are hidden from end users by an NT protected subsystem 102 that implements an exemplary NT programming interface. Devices may be visible as named file objects controlled by the NT Input/Output (IO) Manager 110 to user-mode 104 programs, including for example protected subsystems 102.

Exemplary NT protected subsystem 102, such as for example the Win32® subsystem, may pass IO requests to the appropriate kernel-mode 106 driver through the IO System Services 108. A protected subsystem 102 may insulate its end users (user mode 104) and applications from having to know anything about kernel-mode 106 components, including NT drivers 120, 122. In turn, the NT IO Manager 110 may insulate protected subsystems 102 from having to know anything about machine-specific device configurations or about NT driver 120, 122 implementations.

In an exemplary embodiment, the NT IO Manager's (110) layered approach also insulates most NT drivers 120, 122 from having to know anything about the following: whether an IO request originated in any particular protected subsystem 102, such as Win32 or POSIX; whether a given protected subsystem 102 has particular kinds of user-mode 104 drivers; and, the form of any protected subsystem's (102) IO model and interface to drivers.

In an exemplary embodiment, the IO Manager 110 supplies NT drivers 120, 122 with a single IO model, a set of kernel-mode 106 support routines. These drivers 120, 122 may carry out IO operations, and a consistent interface between the originator of an IO request and the NT drivers 120, 122 that respond to it results. For example, file system 116 requests are a form of IO request.

In an exemplary embodiment, a subsystem 102 and its native applications access an NT driver's device 122 or a file on a mass-storage device 118 through file object handles supplied by the NT IO Manager 110. A subsystem's request to open such a file object (for example, step 1) and to obtain a handle for IO to a device or a data file (for example, step 10) is made by calling the NT IO System Services 108 to open a named file, which has, for example, a subsystem-specific alias (symbolic link) to the kernel-mode 106 name for the file object (for example, step 2).

The NT IO Manager 110, which exports these System Services, may then be responsible for locating or creating the file object (for example, step 3) that represents the device or data file and for locating the appropriate NT driver(s) 120, 122.

In an exemplary embodiment, the system follows a process described below in accordance with FIG. 1 for performing a file open operation. The process comprises an exemplary embodiment only, and any other additional implementations may be used as well in accordance with the present embodiments.

Beginning with exemplary step 1, the subsystem 102 may call an NT IO System Service 108 to open a named file. In exemplary step 2, the NT IO Manager 110 may call the Object Manager 112 to look up the named file and to help it resolve any symbolic links for the file object. It may also call the Security Reference Monitor 114 to check that subsystem 102 has the correct access rights to open that file object.

In exemplary step 3, if the volume (e.g., an area of stored data) is not yet mounted, the IO Manager may suspend the open request, calling one or more NT file systems 116 until one of them recognizes the file object as some thing it has stored on one of the mass storage devices 118 the file system uses. When the file system has mounted the volume, the IO Manager may resume the request.

In exemplary step 4, the IO Manager 110 may allocate memory (e.g., a RAM cache) for and initialize an IO request packet 124 (hereinafter IRP 124) for the open request. To NT drivers 120, 122, an open request may be equivalent to a "create" request.

In exemplary step 5, the IO Manager 110 may call the file system driver 120, passing it the IRP 124.

In exemplary step 6, the file system driver 120 may access its IO stack location 126 in IRP 124 to determine what operation to carry out, checks parameters, determines if the requested file is in cache memory, and, if not, set up the next lower driver's IO stack location 126 in the IRP 124.

In an exemplary embodiment, both drivers 120, 122 may process the IRP 124 and complete the requested IO operation, calling kernel-mode 106 support routines supplied by the IO Manager 110 and by other NT components.

In exemplary step 7, the drivers 120, 122 may return the IRP 124 to the IO Manager 110 with the IO status block set in the IRP 124 to indicate whether the requested operation succeeded and/or why it failed.

In exemplary step 8, the IO Manager 110 may get the IO status from IRP 124, so it can return status information through the protected subsystem to the original caller.

In exemplary step 9, the IO Manager may free the completed IRP 124.

In exemplary step 10, the IO Manager may return a handle for the file object to the subsystem 102 if the open operation was successful. If there was an error, it may return appropriate status information to subsystem 102.

In an exemplary embodiment, after exemplary subsystem 102 successfully opens a file object that represents a data file, a device, or a volume, the subsystem may use the returned file object handle to request that device for IO operations typically in the form of read, write, or device IO control requests. These operations may be carried out by calling the IO System Services 108. The IO Manager 110 may route these requests as IRPs 124 sent to appropriate NT drivers 120, 122.

Figure 2:
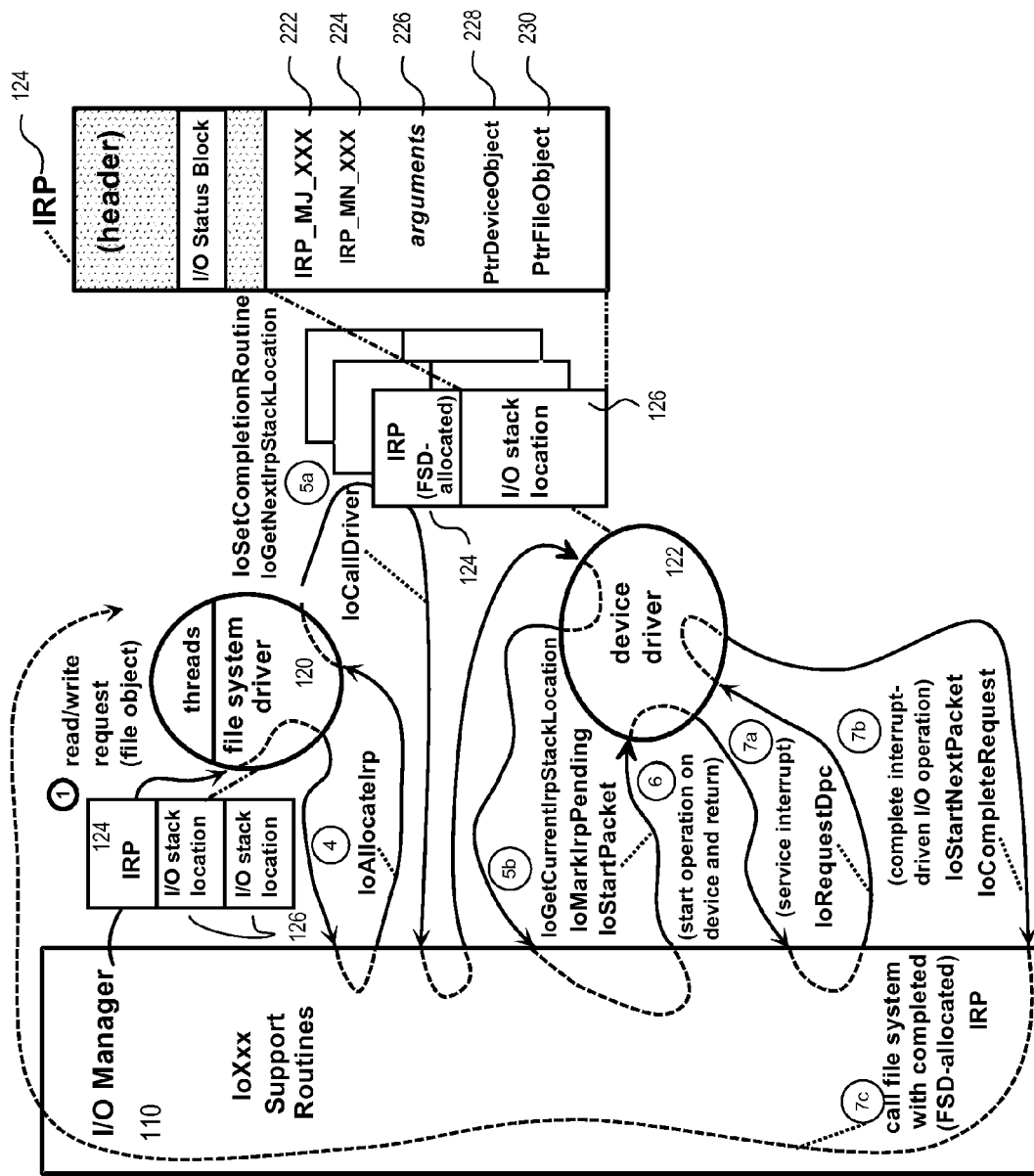
FIG. 2 is a simplified block diagram of an NT® operating system architecture during a process of IRP processing is shown.

Referring to FIG. 2, a simplified block diagram of an NT® operating system architecture during a process of IRP 124 processing is shown, though the present embodiments may be applied to any other operating system architecture and/or operating system architecture processing system. In the exemplary embodiment of FIG. 2, certain support routine steps corresponding to the above noted steps of FIG. 1, are set forth below.

As noted above, in exemplary step 1 an open file request is issued. In addition, in exemplary step 1 (as shown in FIG. 2) in response to an issued read/write request, the IO Manager 110 may call the file system driver (FSD) 120 with the IRP 124 it has allocated for the subsystem's read/write request. The FSD 120 may access its IO stack location 126 in the IRP 124 to determine what operation it should carry out. In an exemplary embodiment, exemplary steps 2 and 3 may be carried out as above described.

Exemplary step 4 comprises a support routine for allocation of IRP 124. In an exemplary embodiment, FSD 120 may sometimes break the originating request into smaller requests by calling an IO support routine, one or more times, to allocate IRPs 124, which may be returned to the FSD 120, for example, with zero-filled IO stack location(s) 126 for lower-level driver(s). At its discretion, FSD 120 may reuse the original IRP 124, rather than allocating additional IRPs 124 as shown in FIG. 2, by setting up the next-lower driver's IO allocation 126 in the original IRP 124 and passing it on to lower drivers.

Exemplary step 5a may comprise a series of support routines. In an exemplary NT operating system, included, for example, are subroutines IoSetCompletionRoutine (e.g., routine that registers an IoCompletion routine, which will be called when the next-lower-level driver has completed the requested operation for the given IRP), IoGetNextirpStackLocation (e.g., routine that gives a higher level driver access to the next-lower driver's I/O stack location in an IRP so the caller can set it up for the lower driver) and IoCallDriver (routine that sends an IRP to the driver associated with a specified device object). Exemplary step 5b may comprise a series of additional support routines. These routines may include IoGetCurrentIrpStackLocation (e.g., routine that returns a pointer to the caller's stack location in the given IRP), IoMarkIrpPending (e.g., routine that marks the specified IRP, indicating that a driver's dispatch routine subsequently returned a status pending because further processing is required by other driver routines), and IoStartPacket (e.g., routine that calls the driver's StartIo routine with the given IRP or inserts the IRP into the device queue associated with the given device object if the device is already busy).

For example, for each driver-allocated IRP 124, the FSD 120 may call an IO support routine to register an FSD-supplied completion routine so the driver is able to determine whether a lower driver satisfied the request and free each driver allocated IRP 124 when lower drivers have completed it. The IO Manager may call the FSD-supplied completion routine whether each driver-allocated IRP 124 is completed successfully, with an error status, or cancelled. A higher-level NT driver is responsible for freeing any IRP 124 it allocates and may set up, on its own behalf, for lower-level drivers. The IO Manager may free the IRPs 124 that it allocates after all NT drivers have completed them. Next, the FSD 120 may call an IO support routine to access the next lower-level driver's IO stack location in its FSD-allocated IRP 124 in order to set up the request for the next-lower driver, which may happen to be the lowest-level driver in FIG. 2. The FSD 120 may then call an IO support routine to pass that IRP 124 on to the next driver.

When it is called with the IRP 124, the physical device driver may check its IO stack location to determine what operation (indicated by the IRP MJ XXX 222 function code) it should carry out on the target device, which may be represented by the device object in its IO stack location 126 and passed with the IRP 124 to the driver. This driver can assume that the IO Manager 110 has routed the IRP 124 to an entry point that the driver defined for the IRP-MJ XXX 222 operation (here, for example, IRP MJ READ or IRP MJ WRITE) and that the higher-level driver has checked the validity of other parameters for the request.

If there were no higher-level driver(s), such a device driver may then check whether the input parameters for an IRP MJ XXX 222 operation are valid. If they are, a device driver 122 may usually call IO support routines to tell the IO Manager that a device operation is pending on the IRP 124 and to either queue or pass the IRP 124 on to another driver-supplied routine that accesses the target device in the form of a physical or logical device such as a disk or a partition on a disk. In addition to the major code IRP MJ XXX 222, minor code IRP_MN_XXX 224, arguments 226, PtrDeviceObject (e.g., pointer to the device object) 228, and PtrFileObject (e.g., pointer to the file object) 230 may be provided in the IO stack location 126 of a given IRP 124.

Exemplary step 6 may comprise a series of support routines for starting operation on a device and return. Here, for example, the IO Manager 110 may determine whether the device driver is already busy processing another IRP 124 for an exemplary target device, queues the IRP 124 if it is, and returns. Otherwise, for example, the IO Manager 110 may route the IRP 124 to a driver-supplied routine that starts the IO operation on its device.

Exemplary step 7a may comprise a series of support routines for a service interrupt. In an exemplary embodiment, when the device interrupts, in an exemplary embodiment the driver's interrupt service routine (ISR) does only as much work as is necessary to stop the device from interrupting and to save necessary context about the operation. The ISR may then call an IO support routine with the IRP 124 to queue a driver-supplied DPC routine to complete the requested operation at a lower hardware priority than the ISR.

Exemplary step 7b may comprise a series of support routines for completing an interrupt-driven IO operation. For example, when the driver's DPC gets control, it may use the context as passed in the ISRs call to IoRequestDpc to complete the IO operation. The DPC may call a support routine to dequeue the next IRP 124 when present and to pass that IRP 124 on to the driver-supplied routine that starts IO operations on the device. The DPC may then set status about the just completed operation in the IRPs IO status block and return it to the IO Manager 110 with IoCompleteRequest.

Exemplary step 7b may comprise a series of support routines for calling a file system with a completed (FSD-allocated) IRP. For example, in an exemplary embodiment the IO Manager 110 may zero the lowest-level driver's IO stack location in the IRP 124 and call the file system's registered completion routine with the FSD-allocated IRP 124. This completion routine may check the IO status block to determine whether to retry the request or to update any internal state maintained about the original request and to free its driver-allocated IRP 124. The file system may often collect status information for all driver-allocated IRPs 124 it sends to lower-level drivers in order to set IO status and complete the original IRP 124. In an exemplary embodiment, when it has completed the original IRP 124, the IO Manager 110 may return NT status, the subsystem's (102) native function, to the original requestor of the IO operation.

In an exemplary embodiment, FIG. 2 also may include (as shown) two exemplary IO stack locations 126 in the original IRP 124 because it may include two NT drivers, a file system driver 120 and a mass-storage device driver 122. The IO Manager 110 may give each driver 120, 122 in a chain of layered NT drivers an IO stack 126 location of its own in every IRP 124 that it sets up. The driver-allocated IRPs 124 do not necessarily have a stack location 126 for the FSD 120 that created them. Any higher-level driver that allocates IRPs 124 for lower-level drivers may also determine how many IO stack locations 126 the new IRPs 124 should have, according, for example, to the StackSize value of the next-lower driver's device object.

In an exemplary embodiment, an NT file system driver 120 accesses the file object through its IO stack location 126 in IRPs 124. Other NT drivers may usually ignore the file object.

The set of IRP 124 major and minor function codes that a particular NT driver handles may sometimes be device-type-specific. However, NT device and intermediate drivers may usually handle the following set of basic requests: IRP MJ CREATE—opens the target device object, indicating that it is present and available for IO operations; IRP MJ READ—transfers data from the device; IRP MJ WRITE—transfers data to the device; IRP MJ DEVICE CONTROL—sets up or resets the device according to a system-defined, device, specific IO control code; and IRP MJ CLOSE—about closing the target device object.

In general, the IO Manager 110 may send IRPs 124 with at least two IO stack locations 126 to device drivers of mass-storage devices 122 because an NT file system may be layered over NT drivers for mass-storage devices 118. The IO Manager 110 may send IRPs 124 with a single stack location to any physical device driver that has no driver layered above it.

Figure 3:
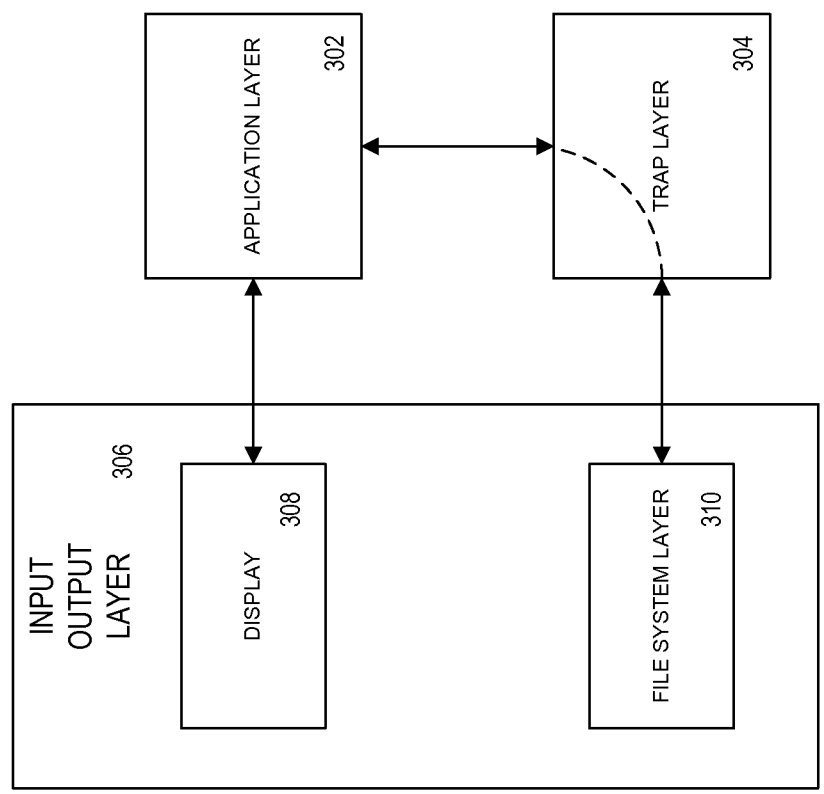
FIG. 3 is a simplified block diagram of an operating system according to the invention.

Referring to FIG. 3, a block diagram of an exemplary operating system is shown, which may be any type of operating system, including without limitation the above noted embodiments.

The block diagram presents a simplified view of operating system functionality according to certain embodiments of the present invention. An exemplary application layer 302 for supporting application execution may communicate with an exemplary input/output layer 306 of the computer. The exemplary input/output layer 306 may include an exemplary display 308 and an exemplary file system layer 310.

The exemplary application layer 302 may communicate with exemplary file system layer 310 for performing read operations and write operations with storage media. Disposed between the application layer and the file system layer may be a trap layer 304, which may also be referred to as a filter layer.

In an exemplary embodiment, each file system access request that is transmitted from the application layer 302 to the file system layer 310 may be intercepted by the trap layer 304. In the trap layer 304, restrictions relating to access privileges may be implemented.

For example, in an exemplary embodiment, some requests are blocked and error messages may be returned to the application layer 302. Other requests may be modified and the modified requests may be passed onto the file system 310.

When a data store is read only, for example, a request to open a file for read-write access may be modified to an open file for read-only access; a request to delete a file may be blocked, and an error message may be returned.

In an exemplary embodiment, the use of exemplary trap layer 304 may be applicable when the certain embodiments are implemented within an existing operating system such as Windows NT®. In alternative embodiments, for example an operating system supporting restricted write access may be designed and restrictions relating to access privileges may be implemented within the file system layer 310.

Figure 4:
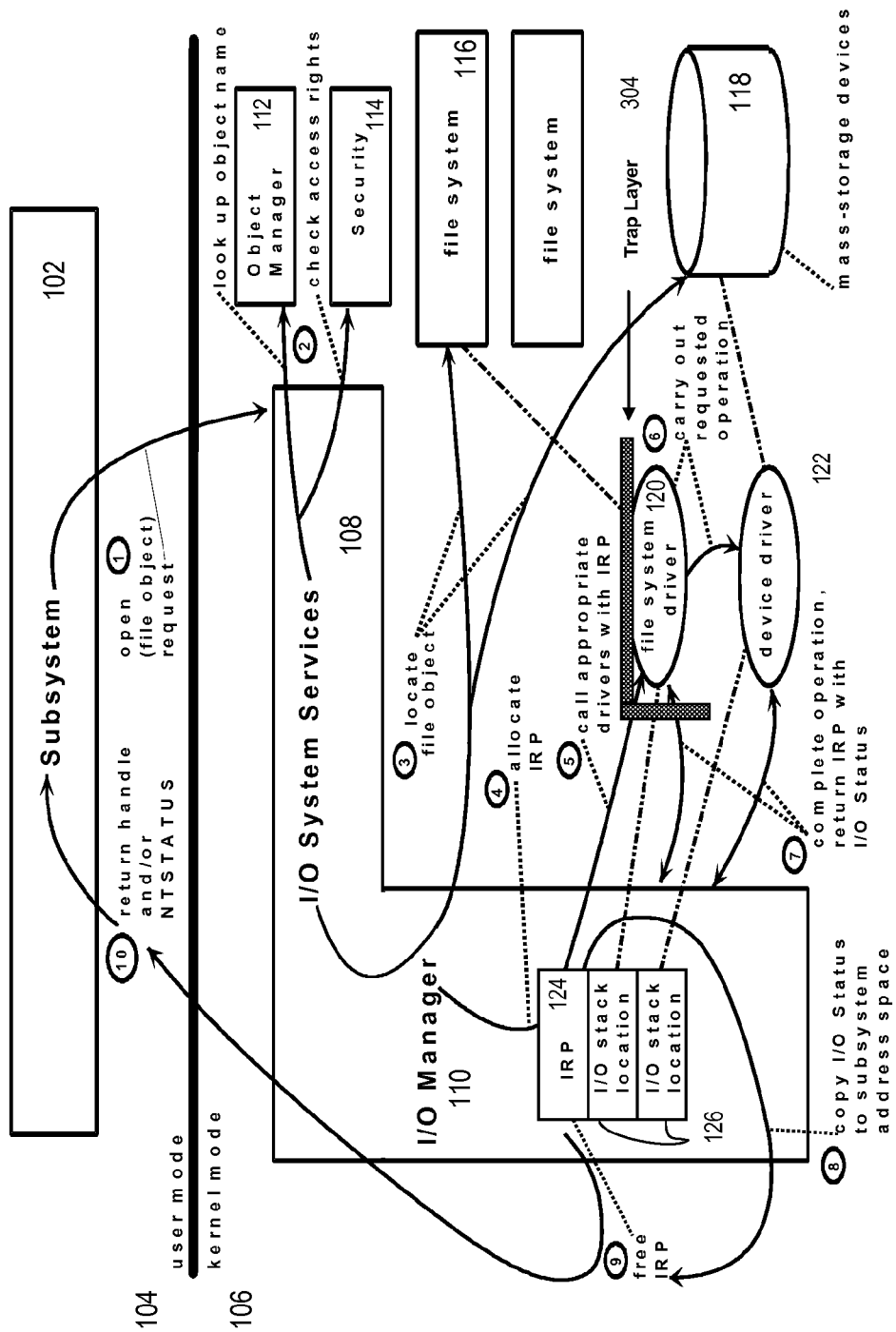
FIG. 4 is a simplified block diagram of a system for opening a file such as that shown in FIG. 1 modified according to the invention.

Referring to FIG. 4, a simplified block diagram of opening a file within Windows NT® according to certain embodiments of the present invention is shown, though the concepts provided in the figure may be applied to any operating systems or related environments, and are in no way limited thereto.

In an exemplary embodiment, the diagram may be based on the diagram of FIG. 1. For example, in an exemplary embodiment, an exemplary trap layer filter 402 (illustrated by a thick black line) may include any of the features and functions above described in relation thereto, including preventing one or more file system operations from passing from an exemplary application layer 302 to an exemplary file system layer 310.

Accordingly, in an exemplary embodiment a data store device, such as mass-storage device 118 for example, may operate as a read/write device with a single device driver. The trap layer 304 may prevent write operations or, alternatively, other predetermined operations from being performed on a specific data store. The trap layer 304 may achieve this, for example, by blocking some requests and by modifying other requests. In this way, some operations may be prevented without requiring modifications to existing applications. Thus, in an exemplary embodiment one data store may be read only while another is read/write. Unlike certain known implementations, an application requesting a write operation to a data store that is read-only, may receive an accurate and appropriate error message. In an exemplary embodiment, there is no data lost by the device driver and, in fact, the device driver may be freed of the trouble of dealing with file system commands which cannot be completed.

Also, the use of the trap layer 304 may allow for implementation of more complicated file access privileges based on data stored within each individual storage medium. For example, a storage medium may indicate read-write access but may not support delete operations. Device drivers may perform low level commands such as read and write. For delete, for example, which is a write operation, the device driver may perform write operations to obfuscate or overwrite a file. As is evident, the device driver may support delete operations, as do any read/write data store, for example. However, by indicating to the trap layer 304 that delete operations are not supported, for example, all delete requests passed from the application layer 302 for the specific data store may be intercepted by the trap layer 304 and an error message may be returned to the application layer 302. Here, for example, no delete operation for a file is passed to the file system layer 310 and therefore, the device driver does not perform the write operations for obfuscating or overwriting the file because none has been received. It is evident that preventing file deletion may be advantageous for protecting archived data and data histories.

Another operation which may be advantageously restricted is overwriting of files. When a request is made to overwrite a file, typically the data within the file may be overwritten. Overwriting of file data may be a simple work around to perform a file delete when that operation is blocked. Alternatively in some devices, the data to overwrite may be written to an unused portion of a storage medium and an address of the file data within a file allocation table may be changed accordingly. The storage locations of the old file data may then be considered free. Preventing data overwrite may be performed according to certain embodiments of the present invention by modifying requests or blocking requests as necessary. Further, by trapping requests to overwrite file data according to certain embodiments of the present invention, a user friendly error message may be possible.

According to an exemplary embodiment, when an application provides a request to overwrite a file, an error message indicating that overwrite is not permitted and that a file name is needed to save the data, may be provided. The trap layer 304, upon receiving the file name from the error message, may modify the request in accordance therewith and in accordance with permitted operations, and may pass the modified request to the file system layer 310. Accordingly, data integrity may be preserved with minimal inconvenience to users of the system.

It may also be useful to restrict access to file access permissions. Permissions may be global across a storage medium and altering of the permissions may not be desirable. Still, many operating systems provide for file and storage medium related access privileges. These may be modifiable, for example, at any time. Since privileges are generally static, there are advantages to setting up privileges for a storage medium such that during normal operation and with normal file system operations, the privileges may be static. Preferably, there may be at least a way to modify the global privileges in case it is desirable to do so. Preventing alteration of privileges may prevent, for example, individuals having access to files from modifying access privileges in any way.

In an exemplary embodiment, another operation that is usefully restricted is overwriting of zero length files. Some operations within some applications may create a zero length file and then overwrite it, thus preventing overwriting of zero length files may directly affect those applications. An example of such an application and operation is the "save as" command in Microsoft Word®. Thus, preventing overwriting of zero length files may effectively prevent "save as" from functioning on the associated medium.

Similarly, renaming a file may be useful for obfuscating data. Preventing renaming of files may prevent hiding existing files or making them more difficult to locate. For example, changing a client's information file name from "Client 101 Information" to "To Do Feb. 18" may make the file hard to locate. Thus, rename is an operation that may be desirable to restrict. Reasons for restricting the other listed operations are evident. Further, restricting other operations may also be advantageous and the present application may not be limited to these operations.

Above mentioned operations which are advantageously restricted may include overwriting files, changing file access permissions and medium access privileges, renaming files, formatting a medium and the like. For example, a medium that does not allow any of the above mentioned operations may provide a complete archival history of the medium's content and prevents alteration or deletion of the data. Such a medium may be very useful for backing up office files or electronic mail.

Figure 5:
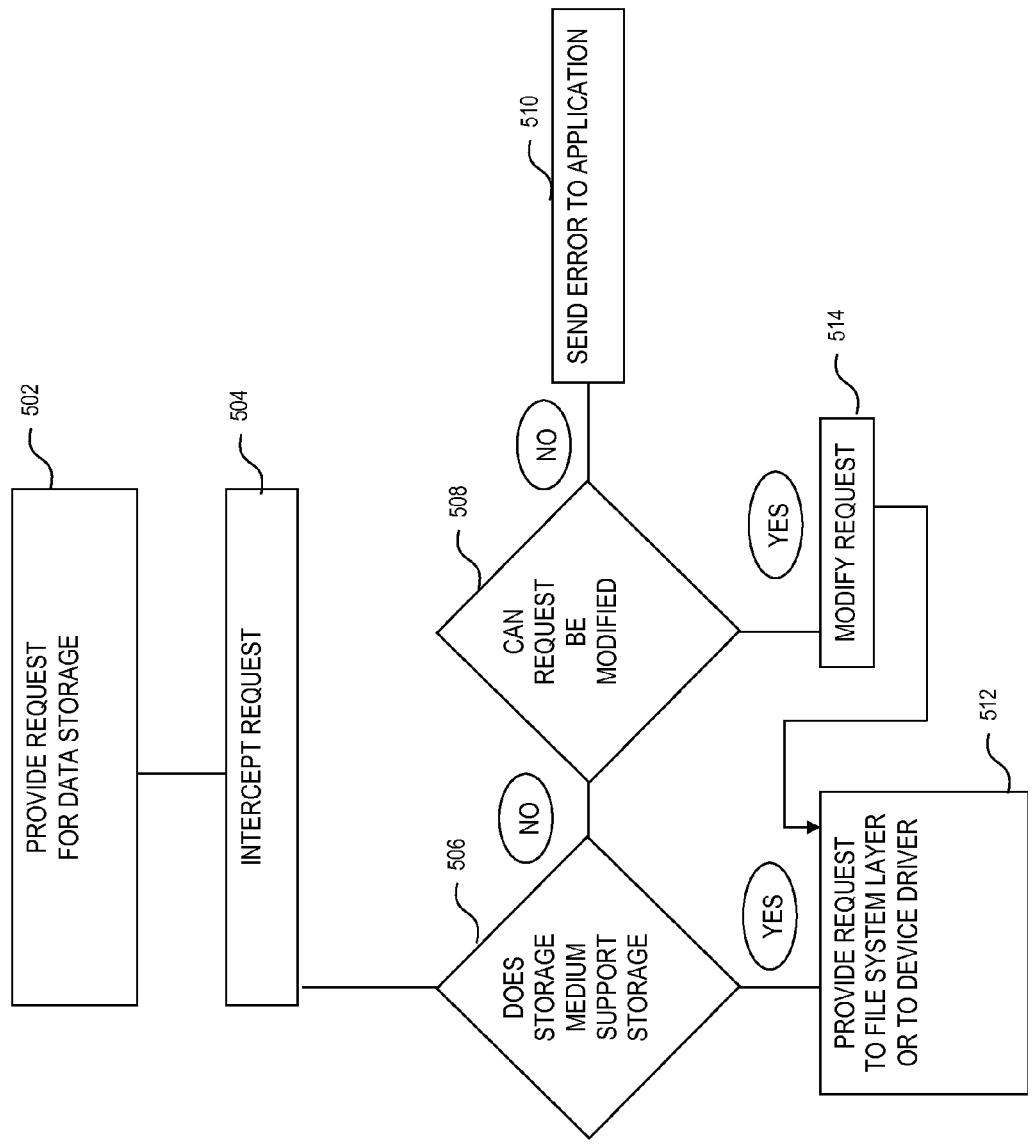
FIG. 5 is a simplified flow diagram of a method of storing data in a storage medium forming part of a system such as that of FIG. 1.

Referring to FIG. 5, a flow diagram of an exemplary method of storing data in a storage medium, in accordance with certain embodiments, for forming part of a system such as that of FIG. 3 is shown. An application in execution on the system may seek to store a data file on a storage medium within the file system layer 310 of the system. In exemplary step 502, a request and data for storage within the file may be transmitted from the application layer 302 to the file system layer 310. The request may include an operation and data relating to a destination storage medium on which to store the data. In exemplary step 504, the trap layer 304 may intercept the request and the data and determine whether the storage medium selected supports the operation.

In exemplary step 506, when the storage medium supports the operation, for example, in step 512 the request and the data may be passed on to the file system layer 310. When necessary, the request may be modified (exemplary steps 508, 514) prior to provision to the file system layer 310 (exemplary step 512). In the file system layer 310, the operation may be conducted according to normal file system layer 310 procedures (exemplary step 512). If in step 506 the storage medium does not support the operation in its original or a modified form (exemplary steps 508, 514), the trap layer 304 may return an indication of this to the application layer 302 (exemplary step 510). The operation and the data may not be passed onto the file system layer 310. This may provide additional access privilege functionality.

Figure 6:
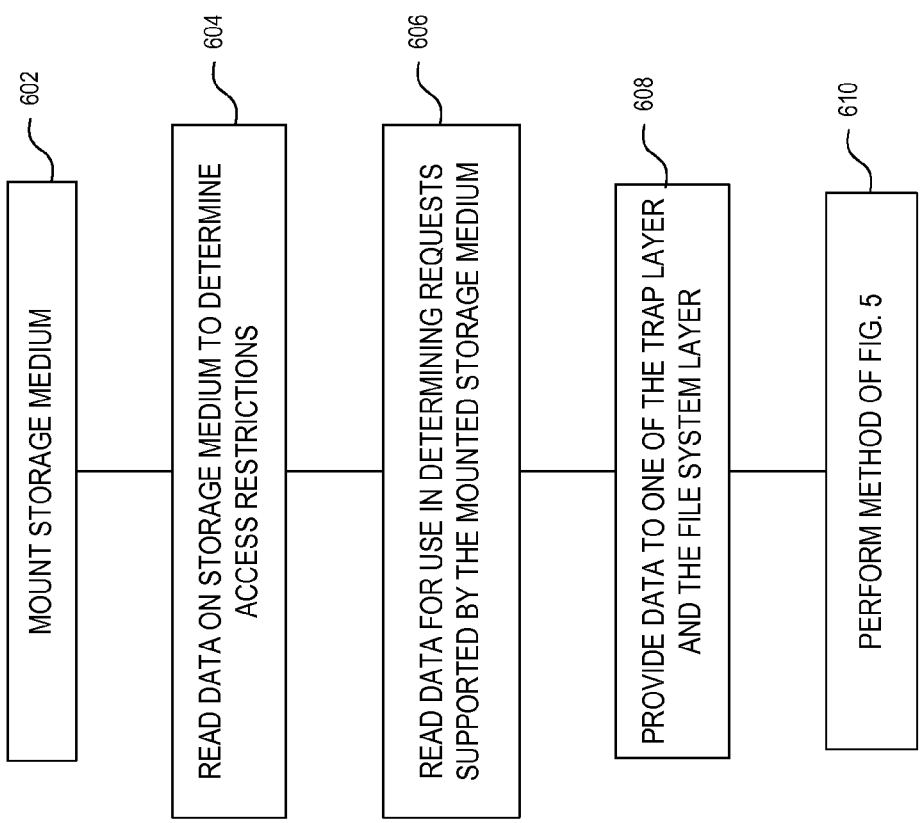
FIG. 6 is a simplified flow diagram of a method of providing software settable access privileges within Windows NT®; and, FIG. 7 is a simplified block diagram of the invention wherein the file system layer includes means for performing the functions of the trap layer.

Referring to FIG. 6, a simplified flow diagram of an exemplary method of providing software settable access privileges within Windows NT® is shown. In exemplary step 602, a storage medium is mounted within a computer system. In exemplary step 604, the storage medium may have stored thereon data relating to access privileges for the storage medium. In exemplary step 606, upon mounting the storage medium, data relating to, for example, physical limitations of the read/write device may be loaded into the device driver for that device within the file system layer 310. The limitations are recognized by the system software. In exemplary step 608, upon mounting the storage medium, the data relating to access privileges for the storage medium may be loaded into the trap layer 304. The trap layer 304 may limit operations performed on the storage medium to those supported by the read/write device by limiting the requests passed onto the file system layer 310 or, when the trap layer 304 forms part of the file system layer 310, by filtering and/or modifying the requests. The data relating to access privileges for the storage medium may be used to limit those requests provided to the file system layer 310. In exemplary step 610, the methods of FIG. 5 may be repeated.

When the storage medium is a data store for archiving purposes, there are evident advantages to treating the storage medium as a read-only storage medium. For example, once the data store is full, setting it to read-only allows its use without risking tampering or accidental modification. Therefore, media specific access privileges are advantageous.

Figure 7:
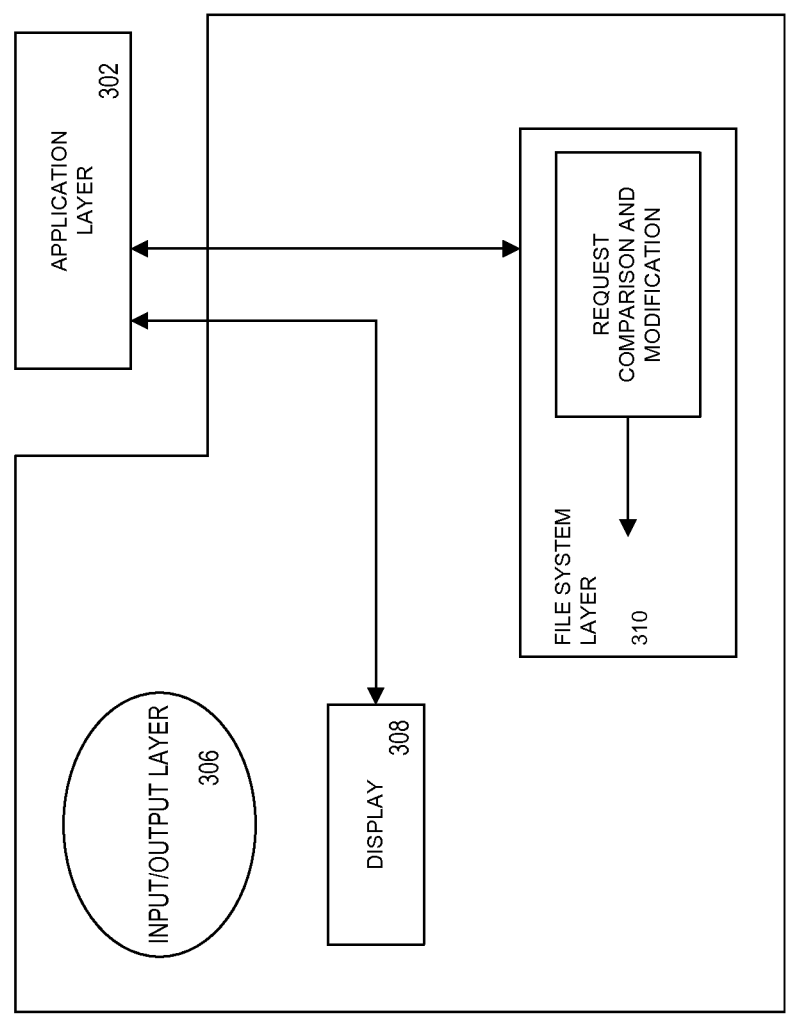

Referring to FIG. 7, a simplified block diagram of exemplary embodiment of the present invention wherein the file system layer 310 includes means for performing the functions of the trap layer is shown. Such an embodiment, operates in a similar fashion to those described above. The file system receives all file access requests and compares them to those that are not permitted. When an access command is not permitted on an indicated storage medium, an error message may be returned to the application layer 302. When an access command is permitted, it may be performed on the appropriate storage medium. The access command may be that requested or, alternatively, a modified form of the requested command resulting in a supported operation.

The term logical storage medium is used herein and in the claim that follow to designate either a physical storage medium or a portion of physical storage medium that is treated by the operating system as a separate storage medium. Thus, a partitioned hard disk with two partitions consists of one physical storage medium and two logical storage media.

According to an exemplary embodiment, a trap layer may be provided, which may intercept requests, and then may do something with the request. For example, in an exemplary embodiment, if the request is deemed permissible, it may be allowed. On the other hand, if the request is deemed not allowed, then the request may be denied. According to another exemplary embodiment, in the event that the request is not allowed, if possible, it may be modified and then perhaps allowed in an exemplary embodiment, as modified. In an exemplary embodiment, the trap layer may be set to intercept requests based on a predefined policy or setting.

According to an exemplary embodiment, the trap layer may be a transparent trap layer. In an exemplary embodiment, the trap layer may intercept requests transparently to the user. In another exemplary embodiment, the trap layer may intercept requests transparently to a computer application invoking the requests. According to another exemplary embodiment, the trap layer may intercept requests based on a predefined policy and/or setting.

According to another exemplary embodiment, the computing environment may be any of various well known computing environments. For example, the computing environment may include a WINDOWS® environment, in an exemplary embodiment. In another exemplary embodiment, the computing environment may include, e.g., but not limited to, any computer operating environment including, e.g., but not limited to, a real file system environment, an advanced file system, an HPFS file system, an NTFS file system, a UNIX file system, a Solaris file system, an Apple file system, an AIX file system, an extended file system on Unix, etc.

A file lifecycle may include an entire existence of a file from the moment of creation through transitions such as moves, renames, retention, preservation or archiving, etc., up until destruction. File operations may include, e.g., but not be limited to, creating; storing; moving; protecting; preserving; archiving; retaining logically or physically, in for example write-once-read-many (WORM) form; deleting; overwriting; replicating; preventing the creation of a particular type of file (for example, an MP3 file) in, for example, a directory; etc.

According to an exemplary embodiment, the trap layer may extend the whole concept of data protection and data preservation into the logical space rather than the traditional physical space. In an exemplary embodiment, the trap layer may ensure that information that is needed will remain accessible throughout its existence. The traditional concepts of archiving and preserving information based on the use of physical WORM Write-Once-Read-Many devices and media realistically is unreasonable. Technology continues to change and given the continuous evolution, it is impractical to assume that the same old hardware 50 years in the future will be able to be connected to newer operating systems and newer servers and that data will remain accessible. In reality, hardware will become obsolete and that in no way minimizes the need to preserve valuable information. In real life, each day valuable information and property such as wallets, keys, cell phones and PDAs is moved. The fact remains that people may continue to carry valuable information and/or property as long as the information and/or property is needed. The fact that people carry wallets does not dictate that people will continue to use the same wallets forever, or that people will maintain the same contents. What may be true is that as long as the specific contents of a wallet are important, the contents will be maintained and transferred to newer wallets.

A concept of data preservation and protection in exemplary embodiments revolve around providing the protection independent of the physical storage enabling the infrastructure to evolve while preserving and securing the data. According to an exemplary embodiment, a logical WORM may be created that may allow the user to utilize the storage resources of choice, for example, a spinning disk, to achieve and meet compliance and legislated data preservation and retention obligations on any storage technology that meets the business needs and requirements.

According to an exemplary embodiment, the trap layer may enforce various policies. According to a first exemplary embodiment, the creation of a new file may be allowed. The file may be created in an unrestricted mode, allowing any and all aspects of the file to be modified such as size, name, data attributes and times. Once the file is closed the trap layer may automatically enforce the restrictions. In other words, the trap layer may allow Create. In the exemplary embodiment, the trap layer may use the privilege to allow the file to be created. At this point the file may be opened in a read/write mode allowing all other operations to be allowed. According to the exemplary embodiment, once the file is closed, the next operation may be to open an existing file and not a creation operation. In the exemplary embodiment, at this point the trap layer may evaluate the operation against the other access privileges, such as, e.g., but not limited to, overwrite, append, change attributes, change permissions, overwrite zero length. If the operation is not allowed the trap layer may simply deny it.

According to a second exemplary embodiment, the creation of a new file may be permitted. The file may be created in an unrestricted mode, allowing any and/or all aspects of the file to be modified such as size, name, data attributes and times. Once the file is closed, in an exemplary embodiment the restrictions may be automatically enforced unconditionally, rendering the file effectively archived upon close operation.

According to a third exemplary embodiment, the creation of a new file may be permitted. Here, the file may be created in an unrestricted mode, allowing any and all aspects of the file to be modified, such as size, name, data attributes and times. The file may remain in an unrestricted mode until an predefined event occurs, upon which the restrictions are changed to deny modifications and in an exemplary embodiment, allow only read operations. According to an exemplary embodiment, this may be implemented by opening a file. In an exemplary embodiment, then a change, such as changing the file attribute to read-only, may trigger the change in the access privilege. The actual evaluation of the access privilege may be evaluated on the file open operation. In an exemplary embodiment, the intentions of the user and/or application may have to be declared at the time of the open operation.

The open file intentions may include whether the file is opened for read-only or for read-write or opened to change attributes or opened for changing permissions, or opened for append or opened for changing file times (creation, last modification or last access times) or opened for rename or opened for move operations.

The open operation may be a part of the access privilege evaluation process.

According to an exemplary embodiment, the trap layer may enforce policies and/or restrictions on a file based on the content of the file. In an exemplary embodiment, the content of the file may determine if the file is eligible to be created. According to an exemplary embodiment, content based policies and/or restrictions may apply to the actual file contents, the file name and the file attributes. In an exemplary embodiment, specific content may make a file eligible to be created. According to an exemplary embodiment, specific content may make a file ineligible to be created.

According to an exemplary embodiment, the trap layer may associate a file with a content group based on the content of the file. In an exemplary embodiment, the trap layer may determine if a file is eligible to be created based on the content group of the file. In an exemplary embodiment, predefined content, such as, e.g., but not limited to strings or specific byte sequences may determine if a file is a member of a specific content group.

According to an exemplary embodiment, evaluation of the content of a file may only be possible once a file is closed and the contents of the file created. In an exemplary embodiment, once a file is closed and the content of the file created, the trap layer may enumerate the file contents, and determine the content group of the file. According to an exemplary embodiment, if a created file is determined to have been ineligible to be created, such as, e.g., but not limited to, the file violates a file creation policy, the trap layer may automatically delete the file. In an exemplary embodiment, instead of deleting ineligible files, the trap layer may trigger other actions, such as, e.g., but not limited to, moving the file to an alternate location.

According to an exemplary embodiment, the trap layer may determine if any number of operations are eligible to be executed on a file based on the content of the file. In an exemplary embodiment, the trap layer may prevent files containing data such as, e.g., but not limited, social security numbers, credit cards and/or other private personal information, from being deleted, accessed or copied. According to an exemplary embodiment, the trap layer may determine if a file is harmful based on the content of a file. In an exemplary embodiment, the trap layer may determine if the file is a computer virus, malware, adware, spyware, computer worm, etc. According to an exemplary embodiment, a content group may comprise types of harmful and/or malicious files. In an exemplary embodiment, the trap layer may prevent harmful files from being created. According to an exemplary embodiment, the trap layer may allow a harmful file to be created to evaluate the contents of the file, and then delete the file if the file is determined to be harmful.

According to an exemplary embodiment, the trap layer may enforce policies and restrictions based on the attributes of the file. In an exemplary embodiment, the attributes of a file may determine whether the file is eligible to be created or not. According to an exemplary embodiment, policies and/or restrictions may apply to the actual file name and file attributes. Example policies and/or restrictions include: (i) determining if the file has a specific attribute, such as a file name that would make the file be eligible to be created; and/or (ii) determining if the file has a specific attribute, such as a file name, which would exclude the file from being created.

In an exemplary embodiment, the trap layer may enforce policies and/or restrictions based on associating a file with a file group, such as, e.g., but not limited to, predefined naming conventions and masks such as strings or wildcard sequence that would determine whether a file is a member of a specific file group or not. According to an exemplary embodiment, the trap layer may determine if any number of operations are eligible to be executed on a file based on the file attributes of the file. According to an exemplary embodiment, the trap layer may determine if a file is eligible to be created based on the file group associated with the file. In an exemplary embodiment, if the file group is allowed then the file may be created. If some of the evaluation of the eligibility of the file creation can only be determined upon completion of the file creation operation, the trap layer may automatically enumerate the file name and other applicable attributes, determine file group association after completion of the file creation operation, and trigger other actions if necessary, such as, e.g., but not limited to, automatically deleting or moving the file.

According to an exemplary embodiment, the policies for access privilege may also enforce retention enforcing restrictions that prohibit modifications on retained files. In an exemplary embodiment, these restrictions may encompass prohibiting all modifications or in some cases, allowing some operations that do not affect the integrity of the user data. According to an exemplary embodiment, the trap layer may allow file security permissions to be modified for retained files since file security permissions only affect who can access the file and do not change the contents of the file.

According to an exemplary embodiment, retained files may have certain restrictions that cannot be changed such as rename, move, overwrite, overwrite zero length and delete that will always be denied on a retained file.

According to an exemplary embodiment, retention restrictions may apply to the actual file contents and may apply to the file name, attributes and file path as well. In an exemplary embodiment, once a file is retained, the file should remain in the same path. According to an exemplary embodiment, allowing a retained file to be renamed or moved to another directory, or even allowing a directory in the path of the retained file to be moved or renamed, will in essence render the file inaccessible by any referencing application or database.

According to an exemplary embodiment, retained files may be assigned an expiry time that may be derived and/or derived from adding a time period to the last modification date and time of the file.

According to an exemplary embodiment, a file may be retained for ever and have no expiry time assigned. The expiry time for a file may be extended. According to an exemplary embodiment, a file may be retained for an indefinite time period allowing an expiry time to be assigned in the future.

According to an exemplary embodiment, once a file is retained its contents "user data" may never be modifiable. An expired file may be either deleted or have the expiry time extended.

According to an exemplary embodiment, retention expiry time may be assigned directly by the user using private IOCTLs or an application. According to an exemplary embodiment, retention expiry may be derived by setting the last access time and then triggering the file to be in a retained state.

According to an exemplary embodiment, the retention trigger may be an event such as changing the state of the read-only attribute, but is not limited to only changing this specific attribute. According to an exemplary embodiment, the retention trigger may be a rename operation. In an exemplary embodiment, an attempt to rename a file to a certain file name identified in the policy may trigger the file to become retained. According to an exemplary embodiment, if the retention is enforced by setting the read-only attribute, then the attribute may be set. In another embodiment, the retention may be set by other means such as creating an extended attribute or an alternate data stream.

An example of why such an operation may be important is that under certain file sharing protocols and applications there may be no clear mapping of the read-only file attribute into other operating systems such as MacOS, UNIX and LINUX. Setting the read-only attribute in windows may be mapped to the UNIX user be a chmod operation rendering a file practically read-only such as 555 or "r-xr-xr-x". The problem may get compounded when the user attempts to set the read-only attribute on a file that resides on Windows OS from UNIX or LINX or MacOS. According to an exemplary embodiment, the user can perform such an operation by using the chmod operation to set the file permissions to 555. In an exemplary embodiment, under certain circumstances the behavior of setting the read-only attribute from Windows may be mapped by Windows services for UNIX to reflect that the file has 555 permissions. According to an exemplary embodiment, the mapping may prevent using the read-only attribute to trigger retention from a client running a variant of UNIX or one were the read-only attribute is not natively defined.

In an exemplary embodiment, a trigger may detect an attempt to change another file attribute, such as, e.g., but not limited to, file name, would be the actual trigger. According to an exemplary embodiment, the attempt to change another file attribute may not actually change the file attribute. In an exemplary embodiment, for example, e.g., a rule could be defined that any attempt to rename a file to "KOM_RETAINED" would be the trigger to retain the file and would not result in the file actually getting renamed. According to an exemplary embodiment, a policy may be defined where files that are renamed to a certain naming convention would be retained. In an exemplary embodiment, another exemplary retention trigger may be an operation to change the file size to non-zero.

According to an exemplary embodiment, the user can define a number of triggers including the permissions or who the owner of the file is. In an exemplary embodiment, the retention policy can include exclusion rules that would exclude files that meet that criteria from being retained. These rules may include such parameters as data identifiers like path, name, mask, extension, size, attribute, permissions, file creation time and file modification time. According to an exemplary embodiment, the retention policy may include inclusion rules that would include files that meet that criteria to be retained. These rules include such parameters as data identifiers like path, name, mask, extension, size, attribute, permissions, file creation time and file modification time.

According to an exemplary embodiment, in the last access time may be used to set the file retention expiry. In an exemplary embodiment, if the last access time is zero then the file may be retained for ever and it will never expire. The user/application may not be able to change the last access time. According to an exemplary embodiment, if the last access time is equal to the last file modification time then the file may be retained indefinitely until it is set to have an expiry time. To set the expiry time on a file that is retained indefinitely, the last access time may be modified to a date and time that is greater than the last modification time. Once the expiry time is reached then the file may be expired and may be deleted. In another exemplary embodiment, if the last access time is set to a value greater than the last modification date, then the last access time may be used as the expiry time of the retention.

According to an exemplary embodiment, an independent file expiry time may be used to set the file retention expiry. In an exemplary embodiment, if the expiry time is set to 0xFFFFFFFFFFFFFFFF then the file may be retained for ever and may will never expire. The user/application may not be able to change the expiry time. According to an exemplary embodiment, if the expiry time is equal to 00:00:00 Thurs. Jan. 1, 1970, or some other pre-defined time, then the file may be retained indefinitely. A file that is retained indefinitely may be assigned an expiry time. Assigning an expiry time may be the only way to expire an indefinitely retained file.

According to an exemplary embodiment, an indefinitely retained file may be expired in a number of ways. In an exemplary embodiment, to set the expiry time on a file that is retained indefinitely, the expiry may modified to a date and time that is greater than zero or it's equivalent, which may be 00:00:00 Thurs. Jan. 1, 1970. Once the expiry time is reached then the file may be expired and may be deleted or the expiry time may be extended. According to another exemplary embodiment, the expiry time may be set to the current time, meaning that the file will be rendered expired as of the current time, literally rendering the file expired. If the retention expiry time is set to a value greater than zero or it's equivalent 00:00:00 Thurs. Jan. 1, 1970 then that may be used as the expiry time of the retention.

According to an exemplary embodiment, the trap layer may initiate and trigger other background operations when a file is retained or when a specific trigger is triggered. In an exemplary embodiment, these actions may include an archive policy, such as, e.g., but not limited to, queuing the file to create additional copies on an alternate media. In an exemplary embodiment, the trap layer retention policy may use an attempt to access a file to trigger the evaluation of other policies, such as an archive policy. According to an exemplary embodiment, if additional triggered actions such as the archive policy are defined, then the file information may be put on a queue to allow other processes to determine what to do with the file. In an exemplary embodiment, in the case of the archive policy, the trap layer may evaluate the archive policy against the file information and determine whether additional copies of the file should be created.

According to an exemplary embodiment, the retention policy expiry may be suspended indefinitely in the event of litigation to prevent valuable files directories and documents from being accidentally destroyed while the litigation is still on going. According to an exemplary embodiment, the suspension may be a legal hold. In an exemplary embodiment, the legal hold may prohibit and/or inhibit the deletion of files even if their retention period is expired.

According to an exemplary embodiment, the trap layer may use a file attribute, such as, e.g., but not limited to, the Temporary Attribute to denote the legal hold status of a retained file. In an exemplary embodiment, a retained file may be put on legal hold by setting the Temporary Attribute on the target file. According to an exemplary embodiment, the legal hold may prevent the file from being eligible for deletion by preventing the clearing of the read-only attribute until the Temporary Attribute is cleared first. In an exemplary embodiment, the legal hold may suspend the processing of the retention expiry, meaning that a file whose retention is expired cannot have the read-only attribute cleared until the legal hold is removed, which may require clearing the temporary attribute first.

According to an exemplary embodiment, the basic concept of the legal hold may expand the retention policy to incorporate restrictions as to prohibit or inhibit the changing of the retention state of a file if there is another attribute or state already set. In an exemplary embodiment, the trap layer may prohibit changing the read-only attribute of a file in the event the temporary attribute is set. In other words, the trap layer may not clear or set the read-only attribute if the temporary attribute is set.

According to the exemplary embodiment, a file that is not retained may not get retained if the legal hold state applies. In an exemplary embodiment, if the temporary attribute is set and the read-only attribute is not set, then there may be no way that the read-only attribute can get set unless the temporary attribute is cleared first. According to an exemplary embodiment, the legal hold may prohibit a file from becoming retained no matter what other triggers are defined.

According to an exemplary embodiment, a file that is in the retained state may not become un-retained if the legal hold state applies. In an exemplary embodiment, if the temporary attribute is set and the read-only attribute is set, then there may be no way that the read-only attribute can be cleared unless the temporary attribute is first cleared. According to an exemplary embodiment, the legal hold may prohibit the retained file from becoming unretained no matter what other triggers are defined.

According to an exemplary embodiment, the legal hold may not have any effect on a file that is retained forever since the retention policy will never allow the file to become eligible for deletion.

According to an exemplary embodiment, a file that is retained for a fixed period and has an explicit expiry date may not expire even if the retention expiration date and time is reached as long as the legal holds state is set. Once the legal hold is cleared, then the file expiration may be processed. If the retention period of file has expired, the file may be deleted.

According to an exemplary embodiment, a file that is retained indefinitely, i.e., does not have an explicit file expiration defined, may not have an expiry date assigned if the legal hold applies. Once the legal hold is cleared the file retention may be modified and a file expiration assigned.

According to an exemplary embodiment, when a file legal hold is triggered the trap layer may perform additional processes to create metadata for the legal hold state. In an exemplary embodiment, operations may include any one of: (i) identifying the retention state and determining whether the file can be set on legal hold or not (if the file is retained forever then the attempt to set legal hold may be failed, otherwise set the legal hold if the file is already retained); (ii) identifying and/or storing who put the file on legal hold (identifying and/or storing the user ID of the user or application that triggered the file be put on legal hold); (iii) identifying and/or storing when the file was put on legal hold; (iv) creating one or more alternate data streams or extended attributes to store the legal hold information about the retained file; and/or (v) encrypting and/or creating hash keys for additional file legal hold information stored with the retained file.

According to an exemplary embodiment, when a file legal hold is cleared, the trap layer may perform additional processes to update the metadata for the legal hold state. In an exemplary embodiment, the operations may include any one of: (i) identifying the retention state and determining whether the file legal hold state is being cleared or not (if the file was is not retained there may be no additional book keeping required to be updated, otherwise the legal hold state may need to be cleared and file associated metadata updated); (ii) identifying and/or storing who cleared the file legal hold (identifying and/or storing the user ID of the user or application that triggered the file to be removed from legal hold); (iii) identifying and/or storing when the legal hold was cleared; (iv) updating one or more alternate data streams or extended attributes storing the legal hold information about the retained file; and/or (v) encrypting and/or creating hash keys for additional file legal hold information stored with the retained file.

According to an exemplary embodiment, the access privilege policy may be extended to control the type of file that may be created using a data identifier and other qualifiers to prohibit the creation of certain types of files or allow them. The qualifiers include file mask, file name, file extension, owner and path. This ability is referred to as file screening where the administrator can define policies that would prohibit personal files such as mp3 and mpg files from being stored on corporate storage resources.

According to an exemplary embodiment, it is conceivable with the availability of access to the sources of open operating systems and file systems to add the trap layer directly into the file system layer to enforce the protection and retention of files.

According to an exemplary embodiment, retaining a file may involve a number of background functions. In an exemplary embodiment, when retention of a file is triggered, an internal process may perform additional work to create the metadata for the retention. According to an exemplary embodiment, additional work may include, any one of: (i) identifying and/or storing who retained the file, for example, e.g., the user ID of the user or application that triggered the retention of the file; (ii) identifying and/or storing when the file was retained; (iii) identifying the applicable retention policy triggering the retention of the file; (iv) determining what the retention expiry should be set to; (v) setting the retention expiry (e.g., setting the value of the file last access date); (vi) generating a digital signature of the file contents, such as, e.g., a SHA hash key (according to an exemplary embodiment, the hash may not be limited to the default data stream associated with the file, but may also extend to alternate data streams of the file); (vii) determining whether there are any other policies that apply, such as, e.g., an archive that would queue and create additional copies of the file on alternate storage resources; (viii) creating a number of alternate data streams or extended attributes to store additional information about the file; and (ix) encrypting and/or creating hash keys for additional file information stored with the file.

According to an exemplary embodiment, the trap layer may intercept an attempted operation and engage another component or action. In an exemplary embodiment, the trap layer may engage another component or action to request validation for the attempted operation to determine if the attempted operation may be allowed. In an exemplary embodiment, the trap layer may do the same for a request. According to an exemplary embodiment, when the file contents of a file matches particular contents, the trap layer may send a message or communicate with another layer or component to determine what the trap layer should do. In an exemplary embodiment, the trap layer may simply notify another layer or component and the other layer or component may make an appropriate decision. According to an exemplary embodiment, the decision of the other layer or component may also be based on a policy or threat level.

According to an exemplary embodiment, the trap layer may validate the contents of a file and/or compare the digital signature whenever a file is opened to determine if the file may be opened. In an exemplary embodiment, the trap layer may evaluate the expiry or retention expiry of a file to determine if access to the file may be allowed. According to an exemplary embodiment, the trap layer may extend the expiration concept to rights management, and may reject file access to a file once the file has expired. In another embodiment, the trap layer may use a policy where the contents of metadata of a file, or some other source, may determine appropriate action.

According to an exemplary embodiment, the trap layer may store the file protection policies with the actual file in accordance with any of the following: (a) the policy may be stored as an alternate data stream; (b) the policy may be stored as an extended attribute; and/or (c) the policy may be stored as private reparse data. The trap layer may have policies to manage directory operations such as any of the following: (a) create sub-directory, rename sub-directory, move sub-directory out, move sub-directory in, delete sub-directory; (b) create file, rename file, move file in, move file out, rename file, delete file, change file attributes, change file permissions, read file; or (c) browse directory—the feature prohibits applications and users that do not know the actual names of the files and sub-directories from being able to browse the contents of the managed logical storage medium. According to an exemplary embodiment, the trap layer may enable users to enforce privacy requirements by limiting access to contents to processes that know exactly the name and path of the files they are trying to access. In an exemplary embodiment, any attempt to browse the contents in an application like Windows explorer may fail regardless of the user and or application. According to an exemplary embodiment, the trap layer may enable third party applications to provide more realistic logs that would reflect the fact that all access to secure content is restricted to the third party application's own applications and context. In an exemplary embodiment, logs may be used for legislation like HIPAA (US) and PIPEDA (Canada).

According to an exemplary embodiment, the trap layer may intercept directory operations to determine possible additional behavior or trigger additional background operations. In an exemplary embodiment, the trap layer may control operations on directories, such as, e.g., but not limited to, deletion operations, rename operations and/or move operations. According to an exemplary embodiment, the trap layer may consider a directory a special kind of file.

In an exemplary embodiment, the trap layer may intercept operations to determine the target of the operations. According to an exemplary embodiment, if the target of a delete operation is determined to be a directory, the trap layer may then determine whether the directory is empty. In an exemplary embodiment, the directory may be considered empty if the directory does not have any child objects, such as, e.g., but not limited to, files or sub-directories. According to an exemplary embodiment, if the directory is empty, the trap layer may allow the directory to be deleted. In an exemplary embodiment, if the directory is not empty, the trap layer may prevent the directory from being deleted. According to an exemplary embodiment, the trap layer may use similar methodologies in governing rename operations on a directory and/or move operations on a directory.

According to an exemplary embodiment, the trap layer may create hash keys that will be used to validate the authenticity of the retained files. For example, (a) the trap layer may be configured to validate the hash key on every open operation and failing the operation if the hash key does not match; and/or (b) the trap layer may be invoked to validate any file on demand by an external operation triggered by the user and/or application. In an exemplary embodiment, the trap layer may create hash keys for all files that are created in managed logical and/or physical storage mediums.

In an exemplary embodiment, the trap layer may automatically encrypt files that are created in managed logical and/or physical storage mediums. The encryption and decryption may, for example, happen independently of the user and/or application. This may enforce security requirements that would prohibit protected files from being accessed outside the context and control of the trap layer.

According to an exemplary embodiment, the trap layer may intercept file deletion operations to perform additional background tasks, such as, e.g., but not limited to, secure erasure. In most secure deployments, regulations such as DOD 5015.2 dictate that deleted files or records must be destroyed and overwritten to insure that the data cannot be restored in any way shape or form. Typically secure erasure may be executed by overwriting the contents of a file with random patterns. Secure erasure requirements extend from privacy legislation as well as defense and military standards, and even extend to corporate governance to reduce liabilities. In an exemplary embodiment, using the trap layer, a user or application may use a simple delete operation, and if the operation is allowed, then secure erasure may be performed transparently without forcing the user or application to perform any additional operations beyond what they are familiar with.

Some exemplary example of the flow of determining if a file should be securely erased is outlined below. According to an exemplary embodiment, when a file deletion operation is attempted, the trap layer may intercept the operation and determine whether the file is retained. If the file is retained, then the trap layer may determine whether the file is eligible for deletion. Eligibility may be determined by the trap layer by comparing the file expiry date and time to determine what kind of file retention is set on the file, such as, e.g., but not limited to, retained forever, retained indefinitely or retained for a fixed period. According to an exemplary embodiment, if the file is retained the trap layer may prevent the deletion of the file. If the file is not retained, then the trap layer may allow the file to be deleted and may perform a number of background operations such as, e.g., but not limited to: (i) overwrite the contents of all the file streams, which may include a default data stream and an alternate data stream, with a pattern that may be either dynamically generated or simply pre-defined; or (ii) repeat the overwrite operation several times, such as, e.g., but not limited to, seven or fifteen times, depending on the applicable rules and regulations.

According to an exemplary embodiment, the trap layer may obfuscate the user data by storing it in alternate data streams or alternate locations rendering the files unreadable and even as far as inaccessible outside the context of the trap layer.

According to an exemplary embodiment, the term outside the context of the trap layer may mean that the trap layer was some how disabled, the trap layer was de-installed, or the storage device was moved and connected to another server that did not have the trap layer installed.

According to an exemplary embodiment, the trap layer may have a private interface that would also protect and prohibit the trap layer from being de-installed or deleted if the case that there are retained files under it's control. The private interface may allow the trap layer to be upgraded but not disabled.

According to an exemplary embodiment, the trap layer may use a secure clock mechanism. In an exemplary embodiment, to enforce the retention expiry times, the trap layer may utilize a secure clock to maintain the system clock current.

According to an exemplary embodiment, the algorithm utilized to secure the system time may be based on the fact that the secure clock is synchronized with GMT. According to an exemplary embodiment, regardless of the time zone the server time may always be represented as a variation of GMT. That means that if the server time zone is EST which is equal to GMT-5, then the server time will have to always maintain the same time difference. To achieve this goal there may be a process monitoring the server time and comparing the server time to the secure clock and resetting the server time to always maintain the same time difference.

The secure time mechanism may authenticate the clock to ensure that it is a sanctioned or authorized clock so that the system cannot be spoofed.

According to an exemplary embodiment, the secure clock may be able to sustain itself independent of the server power to eliminate any time lapses. In an exemplary embodiment, even if the server is shutdown for a long duration or even if the motherboard is replaced or reset, when the server is booted up again the time may be reset in accordance with the difference from the secure clock time, which in this particular example is GMT-5.

According to an exemplary embodiment, the secure clock mechanism may monitor changes in the system time. In an exemplary embodiment, the secure clock mechanism may monitor changes by intercepting attempts to change the time or polling. According to an exemplary embodiment, the secure clock mechanism may initialize a system clock based on a system independent time source and automatically determine what the correct time should be. In an exemplary embodiment the secure clock mechanism may need to adjust the system clock back to the projected time if the system clock changes from the expected time each time the time is polled.

According to an exemplary embodiment, the secure clock mechanism may need to account for potential deviations that may occur based on the inaccuracy of the external time source. According to an exemplary embodiment, the technique to determine the accurate projected time may depend on a number of factors. In an exemplary embodiment, the mechanism may determine how long the external clock has been running and determining what the accurate projection of deviation would be. The clock may typically have a certain deviation that is based on the manufacturer specifications. These deviations may only apply to the clock since the time the clock was started. According to an exemplary embodiment, the mechanism may determine a projected time based on a deviation average accumulated over the duration of the life of the clock running time since the clock was first started. In an exemplary embodiment, the average may need to be to maintained over system restarts and protected to prohibit tampering. According to an exemplary embodiment, the secure clock mechanism may need to determine if the system time is accurate at system startup as well as when the system is running. In an exemplary embodiment, the retention mechanism may need to ensure that the system is valid and that all the associated retention expirations are valid as well.

According to an exemplary embodiment, the trap layer may need to monitor the secure clock mechanism for secure system time violations. In an exemplary embodiment, the trap layer may enforce restrictions in the event the system time is modified and the underlying security mechanism is unable to restore the time to the correct value. According to an exemplary embodiment, restrictions enforced due to time violations may include an number of actions, such as, but not limited to, prohibiting the creation of new files and directories, literally rendering the storage medium as a read-only device, prohibiting and inhibiting the ability to trigger the retention of the file, preventing files from expiring and/or preventing files from being deleted even if they appear to have expired their retention period.

According to an exemplary embodiment, restrictions and/or policies may be defined to allow or disallow certain applications or processes from performing specific operations. In an exemplary embodiment, certain operations which may be normally restricted may be allowed by certain named and/or registered processes. According to an exemplary embodiment, the opposite may be true, certain operations which may be normally allowed may be disallowed for certain named and/or registered processes. In an exemplary embodiment, the trap layer may identify a process belonging to a computer virus and may disallow the process from performing any operation. In an exemplary embodiment, the trap layer may identify to process to be any other type of process and may disallow and/or allow specific operations based on the type of process.

According to an exemplary embodiment, the application and/or process based restrictions and/or policies may function with content based restrictions and/or policies. In an exemplary embodiment, a restriction and/or policy for a process may be based on the contents of one or more files supporting a process. In an exemplary embodiment, the trap layer may evaluate the content of a file launching a process to determine the restrictions and/or policies for the process. According to an exemplary embodiment, the trap layer may disable all operations for a harmful process after determining the harmful process belongs to a virus based on the file launching the process.

According to an exemplary embodiment, a restriction and/or policy for a process may additionally allow and/or disallow operations based on the content of a file the process is attempting to act upon. In an exemplary embodiment, the trap layer may evaluate the content of a file to determine if a particular process may act upon the file. According to an exemplary embodiment, the trap layer may allow a particular process to delete a file containing serial codes but not delete a file containing social security numbers.

In an exemplary embodiment, privileged applications may be created and/or defined. In an exemplary embodiment, a privileged application may be governed by restrictions and/or policies specifically defined for the privileged application. According to an exemplary embodiment, privileged applications may have a digital signature they may use to authenticate themselves with the trap layer.

According to an exemplary embodiment, the trap layer may be created in the context of an application. In an exemplary embodiment, the trap layer may be an application specific trap layer that may trap operations performed by the specific application. According to an exemplary embodiment, the application specific trap layer may enforce restrictions on operations initiated by the specific application. For example, e.g., an application specific trap layer may be able to restrict the operations a specific application may attempt to perform against a retained file.

In an exemplary embodiment, an application specific trap layer may allow the specific application to fail gracefully and/or prohibit attempts by the user to initiate operations that would be failed by other trap layers. The benefit of this approach is that the user interaction with the application is streamlined and the application would be prohibited from initiating operations that would be failed in the first place. For example, e.g., the application specific trap layer may disable the delete operation from being initiated if the file cannot be deleted, e.g., such as when the file may be on legal hold, the file may be retained and the expiry has not been reached, the file may be retained indefinitely and has no defined expiry ("cannot expire"), or the file is retained for ever and cannot expire.

According to an exemplary embodiment, there may be a significant risk when the underlying file that is referenced by an application fails to be deleted or modified. In an exemplary embodiment, applications are supposed to handle such conditions on their own. However, in reality there is no standard and some applications will handle such errors better than others. The best solution may be to take pre-emptive measures by intercepting the requests and validating the policies and whether the operation can be performed and creating a complete transaction that would perform all the background processes and cleanup and then complete the operation all in one step as far as the user interaction is concerned.

According to an exemplary embodiment, the trap layer may expand the scope of operations, making applications more storage and retention aware. In an exemplary embodiment, the trap layer may only allow an operation, such as, e.g., but not limited to, delete, move, execute, rename or append, etc, on an object, such as, e.g., but not limited to, a Microsoft SharePoint, a specific site, a document library, a folder, a leaf, or a file, etc., if the operation may be completed for all of the child objects of the object. According to an exemplary embodiment, the trap layer may intercept operation requests, validate policies and if an operation may be performed, create a complete transaction performing all the background processes and cleanup, and complete the operation. In an exemplary embodiment, the trap layer may determine if an operation may be conducted on an object in a single step from the user's perspective. According to an exemplary embodiment, the trap layer may disable the user from attempting and/or selecting an operation if the operation is predetermined to be unable to be performed.

Worm Hard Disk Drive or Other Storage Device Exemplary Embodiments

According to an exemplary embodiment, a WORM hard drive device may be provided, which may include an exemplary encrypted hard disk drive or other storage device. According to an exemplary embodiment, a storage device may be provided which when encrypted, the contents may not be accessible without decryption access. According to an exemplary embodiment, technology may be provided according to exemplary embodiments to place an exemplary storage device in a read only status. According to an exemplary embodiment, the device may include exemplary intelligence on outside of the storage device which may be used to manage a process. According to an exemplary embodiment, the storage device may include a fixed disk, a hard disk device (HDD), a solid state memory device, SDRAM memory, NAND memory, magnetic, magneto-optical, solid state, or other type memory and/or storage device, etc. According to an exemplary embodiment, the device may include software or other firmware to autolaunch up, e.g., but not limited to, coupling to a device (such as, e.g., but not limited to, by an interface coupling such as by a USB device. The exemplary autolaunch or executed application, program, etc. may prompt to have the user enter a password or other authentication/validation information, and upon receiving such information may either provide access to the device in read only or tamperproof fashion, according to an exemplary embodiment, and may be locked down. In an exemplary embodiment, the device may be further ruggedized. According to an exemplary embodiment, a storage device may be used and at least two partitions may be placed on the device, according to an exemplary embodiment. A first partition may be used to control access to a second of at least two partitions. According to an exemplary embodiment, the device may further be made portable. According to an exemplary embodiment, upon coupling the device to an exemplary computing device, such as, e.g., but not limited to, a writable server device, then the exemplary storage device may appear to the server device as a WORM device, such as, e.g., but not limited to, a CD-ROM. According to an exemplary embodiment, a software, hardware or firmware application may enforce access controls over the exemplary storage device making a normally read/write device behave as a write once read many (WORM) device, according to an exemplary embodiment.

Create Exemplary Secure WORM Volumes

According to an exemplary embodiment, volumes that can be created according to exemplary embodiments, may be usually encrypted to enforce security on the exemplary volume and may protect data-at-rest, according to an exemplary embodiment.

a. The contents of an exemplary volume may remain protected and may be completely concealed unless there are secure system components in place permitting access, according to an exemplary embodiment.

b. These exemplary software components that may be used to access the exemplary volume may include several exemplary components to, e.g., but not limited to, decrypt the exemplary embodiment of the exemplary volume and others to enforce data protection on the individual files that may be stored within the volume, according to an exemplary embodiment.

c. Stored within the exemplary encrypted Volume, according to an exemplary embodiment, may be a password (or other means of authentication/validation, etc.), according to an exemplary embodiment. According to an exemplary embodiment, e.g., if the password is set, then the password may be required to be entered to unlock the exemplary volume, even for just read-only access, according to an exemplary embodiment.

These exemplary volumes, according to an exemplary embodiment, can be created on any media whether removable or not; including, e.g., but not limited to, HDD, SSD, NAND, FLASH, storage devices, solid state or otherwise, etc.

The exemplary volumes may have an exemplary at least two (2) modes of operation:

a. On an exemplary secure system: where all exemplary components may have been installed, then the system time may be protected, according to an exemplary embodiment.

i. In this environment one can be certain that the data retention enforcement can be processed since the system time may be maintained securely, according to an exemplary embodiment. So the volume may be made writable in this configuration, according to an exemplary embodiment.

ii. The fact the exemplary volume may be writable, according to an exemplary embodiment, does not necessarily imply that all files are made writable but rather that files that are not retained, and files whose retention has expired, and are not under legal hold, may be, e.g., but not limited to, deleted if the policies allow such exemplary operations, according to an exemplary embodiment.

iii. According to an exemplary embodiment, there must be available space on the exemplary volume to create new files, according to an exemplary embodiment.

iv. According to an exemplary embodiment, if the exemplary volume is protected with a password then the password may be saved on the exemplary encrypted portion of the disk and an encrypted version of the password may be saved on the exemplary system registry, according to an exemplary embodiment. This may allow the exemplary volumes to become writable provided all the components are there that may protect the system after a system reboot operation, according to an exemplary embodiment.

b. On an exemplary non-secure system where the system time and other security is not secure, or may not have been installed, according to another exemplary embodiment.

i. In this environment, according to an exemplary embodiment, one cannot be certain that the data retention enforcement can be processed since the system time may not be secure. So the exemplary volume may be only available in read-only mode in this configuration, according to an exemplary embodiment.

ii. According to another exemplary embodiment, in this exemplary mode, one may be certain that the exemplary volume must remain read-only. According to an exemplary embodiment, the device may be adapted to be accessible in a similar fashion to having a writable CD or DVD being accessed in a reader, but not a writer device. No files can be deleted, and none of the contents can be modified, according to an exemplary embodiment.

iii. If the volume is protected with a password, according to an exemplary embodiment, then the password may be required to be entered to be provided access to the exemplary volume contents and may be adapted to mount the exemplary file system on the exemplary volume. The password in this configuration may be never saved on the system and each time the system is rebooted or the volume is removed and re-inserted then a prompt may be displayed to the user to provide the password, or authentication, which may be required to be re-entered to provide any access to the exemplary contents, according to an exemplary embodiment.

Create Exemplary Portable Secure WORM Volumes

To facilitate portability then in one exemplary embodiment, it may be ensured that some components be provided on the exemplary system to ensure access to the exemplary volume contents even when not in a totally secure environment, according to an exemplary embodiment.

Ideally an exemplary embodiment may include installing some of these exemplary components, according to an exemplary embodiment.

To address exemplary portability, according to one exemplary embodiment, a reserved area on a physical volume may be reserved. This area, according to an exemplary embodiment, may be setup with an exemplary standard file system and simplified setup that may be automatically launched, may be included, according to an exemplary embodiment. Once the exemplary setup application may be launched, the application may setup the exemplary minimal portable software components that may enable the exemplary remainder of the exemplary volume to be unlocked for exemplary read-only access, according to an exemplary embodiment.

In this mode, according to an exemplary embodiment, the exemplary secure volume may be only accessible in an exemplary read-only mode and could never be accessed in a writable mode, according to an exemplary embodiment.

If the exemplary volume may be protected with an exemplary password authentication then the password must be entered to access the exemplary volume contents and according to an exemplary embodiment, may mount the exemplary file system on the exemplary volume. The exemplary password in this exemplary configuration may never be saved on the exemplary system and each time the exemplary system is rebooted or the exemplary volume is removed and re-inserted, for example, then the exemplary password must be re-entered to enable access to the exemplary contents, according to an exemplary embodiment.

In another exemplary embodiment, an exemplary removable storage device or drive may be preformatted before sale with an exemplary 2 (or more) partitions, one that has the software and the other that has an exemplary secure encrypted volume, according to an exemplary embodiment.

If you connect the exemplary storage device or drive to an exemplary writer system then the exemplary volume may be writable and otherwise the exemplary device may be accessible only in a read-only manner. Given that exemplary control components may not be natively available on an exemplary storage device, the exemplary components may be installed on an exemplary reader system from an exemplary non-secure partition, according to an exemplary embodiment.

According to an exemplary embodiment, an exemplary storage device such as, e.g., but not limited to, a flash universal serial bus (USB) stick, such as, e.g., but not limited to, those available from companies like SANDISK, etc., may according to an exemplary embodiment be made secure and read-only, so as to appear to an exemplary interfacing computer system as a normal WORM, (e.g., CD-ROM drive) device. According to an exemplary embodiment, an exemplary interfacing computing system may be used to launch and install exemplary components on an exemplary reader environment.

Numerous other embodiments of the invention may be envisaged without departing from the spirit and scope of the invention.

What is claimed is:

1. A method for applying an operation access privilege to a storage medium, comprises:
associating an operation access privilege with at least a portion of the storage medium;
intercepting by at least one trap layer an attempted operation on said at least a portion of the storage medium, wherein said intercepting occurs regardless of an identity of a user attempting the attempted operation;
comparing the attempted operation to the operation access privilege; and
allowing, or denying the attempted operation based on the comparing the attempted operation to the operation access privilege.

2. The method according to claim 1, wherein said allowing or said denying, by the at least one computer processor, comprises at least one of:
allowing, or denying, by the at least one computer processor, the attempted operation based on a content of a logical file associated with said at least a portion of the computer storage medium.

3. The method according to claim 2, wherein said allowing, or said denying, by the at least one computer processor, comprises at least one of:
allowing, or cancelling, by the at least one computer processor, the attempted operation based on the content of the file.

4. The method according to claim 1, wherein said allowing, or said denying, by the at least one computer processor, the attempted operation comprises:
allowing, by the at least one computer processor, a create file operation to create a file on at least a portion of the computer storage medium;
evaluating, by the at least one computer processor, a content of the file; and
at least one of:
allowing, by the at least one computer processor, the attempted operation, or
deleting, by the at least one computer processor, the file based on said evaluating.

5. The method according to claim 1, wherein said associating, by the at least one computer processor, the access privilege comprises:
associating, by the at least one computer processor, the computer file system operation access privilege with said at least a portion of the computer storage medium based on a file attribute of a logical file associated with said at least a portion of the storage medium.

6. The method according to claim 1, wherein said enforcing, by the at least one computer processor, the computer file system operation access privilege comprises:
enforcing, by the at least one computer processor, a retention access privilege comprising:
preventing, by the at least one computer processor, said a least a portion of the computer storage medium in a retained state from being modified while a retention period of said at least a portion of the storage medium is unexpired.

7. The computer implemented method according to claim 6, wherein said enforcing, by the at least one computer processor, the retention access privilege is enforced for at least one of: a file name, a file attribute, a file path, or a file content, of a logical file associated with said at least a portion of the computer storage medium.

8. The computer implemented method according to claim 6, wherein said enforcing, by the at least one computer processor, the retention access privilege comprises:
determining, by the at least one computer processor, if said at least a portion of the computer storage medium is eligible to enter the retained state based on a content of said at least a portion of the computer storage medium.

9. The computer implemented method according to claim 8, wherein said determining, by the at least one computer processor, comprises:
determining, by the at least one computer processor, if said at least a portion of the computer storage medium is eligible to enter the retained state based on a content group associated with said at least a portion of the computer storage medium, the content group associated based on evaluating, by the at least one computer processor, said at least a portion of the computer storage medium for pre-defined content.

10. The computer implemented method according to claim 6, wherein said associating, by the at least one computer processor, the retention access privilege comprises holding the retained state.

11. The computer implemented method according to claim 10, wherein said holding, by the at least one computer processor, the retained state comprises at least one of:
   suspending, by the at least one computer processor, expiration of a retained state portion of the computer storage medium;
   suspending, by the at least one computer processor, an unexpired retained state portion of the computer storage medium from entering an expired retained state;
   suspending, by the at least one computer processor, clearing, by the at least one computer processor, of a read only attribute of the retained state portion of the computer storage medium by setting, by the at least one computer processor, a temporary attribute of the retained state portion of the computer storage medium; or
   suspending, by the at least one computer processor, deletion, by the at least one computer processor, of an expired retained state portion of the computer storage medium.

12. The computer implemented method according to claim 1, wherein said allowing or denying comprises:
   enforcing, by the at least one computer processor, the computer file system operation access privilege comprising:
      enforcing a retention access privilege comprising:
         triggering, by the at least one computer processor, one or more background processes when said at least a portion of the computer storage medium enters a retained state.

13. The computer implemented method according to claim 12, wherein the one or more background processes comprises at least one of:
   creating, by the at least one computer processor, metadata for the retention;
   identifying, by the at least one computer processor, the user retaining said at least a portion of the computer storage medium;
   storing, by the at least one computer processor, user identification for the user retaining, by the at least one computer processor, said at least a portion of the computer storage medium;
   identifying, by the at least one computer processor, the retention access privilege retaining, by the at least one computer processor, said at least a portion of the computer storage medium;
   storing, by the at least one computer processor, the retention access privilege retaining, by the at least one computer processor, said at least a portion of the computer storage medium;
   generating, by the at least one computer processor, a digital signature of the content of said at least a portion of the computer storage medium;
   generating, by the at least one computer processor, a digital signature comprising a hash of the content of said at least a portion of the computer storage medium;
   generating, by the at least one computer processor, a digital signature of the content of at least one of a default data stream associated with a file associated with said at least a portion of the computer storage medium or one or more alternate data streams associated with the file associated with said at least a portion of the computer storage medium;
   storing, by the at least one computer processor, the digital signature;
   determining, by the at least one computer processor, if any other policies apply;
   creating, by the at least one computer processor, at least one of an alternate data stream or an extended attribute to store the metadata;
   encrypting, by the at least one computer processor, hash keys for the metadata; or
   storing, by the at least one computer processor, the hash keys.

14. The computer implemented method according to claim 6, wherein said enforcing, by the at least one computer processor, the retention access privilege comprises:
   triggering, by the at least one computer processor, retention of said at least a portion of the computer storage medium based on at least one of:
   the attempted operation;
   setting, by the at least one computer processor, a read-only attribute of the file;
   renaming, by the at least one computer processor, the file to a file name;
   renaming, by the at least one computer processor, the file to a particular name;
   resizing, by the at least one computer processor, the file;
   resizing, by the at least one computer processor, the file to a particular size;
   creating, by the at least one computer processor, an extended attribute associated with the file; or
   creating, by the at least one computer processor, an alternate data stream associated with the file.

15. The computer implemented method according to claim 6, wherein said enforcing, by the at least one computer processor, the retention access privilege comprises:
   enforcing, by the at least one computer processor, an archive access privilege comprising queuing, by the at least one computer processor, said at least a portion of the computer storage medium to be copied to an alternate media, when said at least a portion of the computer storage medium is retained.

16. The computer implemented method according to claim 1, wherein said allowing, or said denying, by the at least one computer processor, the attempted operation comprises:
   forcing, by the at least one computer processor, a secure erasure for a delete operation on said at least a portion of the computer storage medium, wherein the secure erasure comprises at least one of:
   overwriting, by the at least one computer processor, the content of said at least a portion of the computer storage medium, or
   overwriting, by the at least one computer processor, an alternate data stream associated with said at least a portion of the computer storage medium.

17. The computer implemented method according to claim 1, wherein said allowing, or said denying, by the at least one computer processor, comprises at least one of:
   allowing, by the at least one computer processor, the operation on a directory if the directory is empty; or
   denying, by the at least one computer processor, the operation on the directory if the directory is not empty.

18. The computer implemented method according to claim 1, wherein said allowing, or said denying, by the at least one computer processor, comprises at least one of:
   allowing, or denying, by the at least one computer processor, the attempted operation based on at least one of an application or a process attempting, by the at least one computer processor, the attempted operation.

19. The computer implemented method according to claim 18, wherein said allowing, or said denying, by the at least one computer processor, the attempted operation based on at least one of the application or the process comprises at least one of:
- allowing, by the at least one computer processor, the attempted operation for at least one of a named or a registered process;
- denying, by the at least one computer processor, the attempted operation for at least one of the named or the registered process; or
- allowing, by the at least one computer processor, the attempted operation for a privileged application, the privileged application comprising:
  - an application operable to be authenticated, by the at least one computer processor, via a digital signature.

20. The computer implemented method according to claim 1, wherein said allowing or denying comprises:
enforcing the computer file system operation access privilege comprises enforcing a access privilege based on an application, the access privilege comprising at least one of:
- enforcing, by the at least one computer processor, application based intercepting of the attempted operation;
- disabling, by the at least one computer processor, an operation option provided to the user;
- expanding, by the at least one computer processor, the scope of an operation based on the application; or
- at least one of allowing, or denying, by the at least one computer processor, the attempted operation based on validating, by the at least one computer processor, a child object of a parent object of an attempted operation.

21. The computer implemented method according to claim 1, wherein said allowing or denying comprises:
enforcing the computer file system operation access privilege comprises enforcing, by the at least one computer processor, a secure time routine, the routine comprising at least one of:
- using, by the at least one computer processor, a secure clock;
- maintaining, by the at least one computer processor, a system clock comprising using the secure clock;
- accounting, by the at least one computer processor, for deviations based on inaccuracies of the secure clock;
- verifying, by the at least one computer processor, operation of a secure clock or authenticating the secure clock;
- at least one of:
  - denying, by the at least one computer processor, at least one attempted operation,
  - preventing, by the at least one computer processor, said at least a portion of the computer storage medium from being retained, or
  - rendering, by the at least one computer processor, the computer storage medium read-only, if the secure clock can not be at least one of: verified, by the at least one computer processor, or authenticated, by the at least one computer processor; or
- running, by the at least one computer processor, the secure clock independent of a server.

22. The computer implemented method according to claim 1, further comprising:
- evaluating, by the at least one computer processor, content of a file at time of file creation wherein said file is configured to launch a process; and
- launching, by the at least one computer processor, the process to determine at least one restriction or computer file system operation access privilege for the process.

23. The computer implemented method according to claim 22, comprising:
- determining, by the at least one computer processor, a harmful process belongs to a virus based on said launching, by the at least one computer processor; and
- disabling, by the at least one computer processor, at least one operation for said harmful process.

24. The computer implemented method of claim 1, further comprising at least one of:
- assigning, by the at least one computer processor, metadata to a given file relating to operations permitted on said given file;
- assigning, by the at least one computer processor, metadata to a given file relating to validating contents of a given file; or
- confirming, by the at least one computer processor, contents have not been modified or tampered with, comprising at least one of: a hash, a hash key, an SHA hash, an encryption key, or a digital signature.

25. The computer implemented method of claim 1, wherein said intercepting, by the at least one computer processor, further comprises at least one of:
- interacting, by the at least one computer processor, between said at least one computer file system trap layer or said at least one computer file system filter layer and at least one other component;
- retrieving, by the at least one computer processor, additional information by said at least one computer file system trap layer or said at least one computer file system filter layer; or
- determining, by the at least one computer processor, a role said at least one computer file system trap layer or said at least one computer file system filter layer will perform comprising:
  - determining, by the at least one computer processor, whether to at least one of: allow, reject, or modify a request.

26. The computer implemented method of claim 1, wherein said intercepting, by the at least one computer processor, further comprises:
- triggering, by the at least one computer processor, by said at least one computer file system trap layer or said at least one computer file system filter layer initiating other actions comprising at least one of:
- intercepting, by the at least one computer processor, a delete operation, and determining, by the at least one computer processor, when to actually erase contents, wherein, at least one of:
  - an erasure comprises overwriting, by the at least one computer processor, at least one of content or at least a portion of a file with a predetermined pattern;
  - an erasure is triggered immediately, by the at least one computer processor; or
  - an erasure is tagged, by the at least one computer processor, when the file is marked for deletion and at least one of:
    - the actual erasure takes place, by the at least one computer processor, once the file is closed, depending on file system; or
    - the erasure is performed on file cleanup, by the at least one computer processor, after the file is closed.

27. The computer implemented method of claim 1, wherein said intercepting, by the at least one computer processor, further comprising:
- triggering, by the at least one computer processor, by said at least one computer file system trap layer or said at least one computer file system filter layer initiating, by the at least one computer processor, other actions comprising at least one of:
creating, by the at least one computer processor, file signatures upon certain conditions comprising when the file retention is triggered comprising at least one of:
creating, by the at least one computer processor, said file signature when the file is finally closed and is no longer modified;
creating, by the at least one computer processor, said file signature triggered immediately; or
creating, by the at least one computer processor, said file signature when the file is in final cleanup and all handles or channels are closed, or contents are flushed from the cache.

28. The computer implemented method of claim 1, wherein said intercepting further comprises at least one of:
triggering, by the at least one computer processor, by said at least one computer file system trap layer or said at least one computer file system filter layer initiating other actions comprising at least one of:
intercepting, by the at least one computer processor, at least one of: a plurality of file types; at least one directory; or alternate data streams;
interrogating, by the at least one computer processor, contents of at least one directory to enable additional operations comprising at least one of:
determining, by the at least one computer processor, if said at least one directory is empty, or not,
determining, by the at least one computer processor, whether to allow at least one of rename, or delete operations,
determining, by the at least one computer processor, if the at least one directory is not empty and if not empty, then at least one of:
rejecting, by the at least one computer processor, all delete operations,
rejecting, by the at least one computer processor, all rename operations, or
rejecting, by the at least one computer processor, all move operations, or
determining, by the at least one computer processor, if the at least one directory is not empty, and if not empty, then at least one of:
allowing, by the at least one computer processor, all operations, or
allowing, by the at least one computer processor, certain operations;
intercepting, by the at least one computer processor, an open directory for enumeration operation to prevent browsing of at least one directory contents comprising at least one of:
allowing, by the at least one computer processor, file and directory operations that are for a specific file or directory name to succeed, but making, by the at least one computer processor, operations enumerating contents fail;
intercepting, by the at least one computer processor, similar operations comprising at least one of: modifying, by the at least one computer processor, security, adding or removing files, by the at least one computer processor, changing attributes, by the at least one computer processor, or adding or removing, by the at least one computer processor, directories;
intercepting, by the at least one computer processor, operations to the default data stream portion of a file, or alternate data streams, and conditionally allowing, disallowing, or modifying, by the at least one computer processor, such requests depending on policies; or
determining, by the at least one computer processor, policies dynamically by at least one of: querying, by the at least one computer processor, a parent directory, querying, by the at least one computer processor, a parent volume, querying, by the at least one computer processor, associated policies, defining, by the at least one computer processor, policies at an individual object level, forcing, by the at least one computer processor, additional operations, or triggering, by the at least one computer processor, other operations.

29. The computer implemented method of claim 1, wherein said at least one computer file system trap layer or said at least one computer file system filter layer automatically encrypts or decrypts, by the at least one computer processor, contents of a logical storage volume or medium, and at least one of:
wherein if the at least one computer file system trap layer or said at least one computer file system filter layer is unavailable then contents are obscured, by the at least one computer processor, by the encryption of the contents on the physical volume;
wherein if the at least one computer file system trap layer or said at least one computer file system filter layer determines conditions are normal, then the at least one computer file system trap layer or said at least one computer file system filter layer allows access to the volume, by the at least one computer processor, and decrypts contents, by the at least one computer processor, allowing, by the at least one computer processor, the actual files to be accessed as a normal file system; or
wherein if the at least one computer file syste trap layer or said at least one computer file system filter layer determines, by the at least one computer processor, that conditions are abnormal, then the at least one computer file system trap layer or said at least one computer file system filter layer, by the at least one computer processor, rejects all access requests.

30. The computer implemented method of claim 1, wherein said intercepting, by the at least one computer processor, is further comprising at least one of:
triggering, by the at least one computer processor, by said at least one computer file system trap layer or said at least one computer file system filter layer initiating other actions comprising at least one of:
intercepting, by the at least one computer processor, an additional partition, or volume management operations, and
depending, by the at least one computer processor, on the protection policies, at least one of allows or disallows, by the at least one computer processor, said volume management operations, or modifies, by the at least one computer processor, said volume management operations to prohibit any anomalies comprising at least one of:
preventing, by the at least one computer processor, delete or format operations on protected partitions; or
intercepting, by the at least one computer processor, other operations comprising at least one of:
snapshot creation, by the at least one computer processor,
dismount operations, by the at least one computer processor, or partition resizing, by the at least one computer processor comprising:
shrinking, by the at least one computer processor, or
expansion, by the at least one computer processor.

31. The computer implemented method of claim 1, wherein said intercepting, by the at least one computer processor, comprising at least one of:
wherein said at least one computer file system trap layer or said at least one computer file system filter layer is implemented to at least one of: validate and compare, by the at least one computer processor, byte streams, or search, by the at least one computer processor, for digital signatures;
wherein said at least one computer file system trap layer or said at least one computer file system filter layer interacts, by the at least one computer processor, with additional components on the hardware level to at least one of: determine, by the at least one computer processor, additional operations or restrictions, or to trigger, by the at least one computer processor, additional actions within the at least one computer file system trap layer or said at least one computer file system filter layer, or to trigger, by the at least one computer processor, additional actions at the hardware layer;
wherein said at least one computer file system trap layer or said at least one computer file system filter layer triggers, by the at least one computer processor, additional actions on a physical storage device comprising at least one of: triggering, by the at least one computer processor, certain logical, or physical sectors of the computer storage medium to become un-readable, un-writable; or un-modifiable, by the at least one computer processor;
wherein said at least one computer file system trap layer or said at least one computer file system filter layer enables, by the at least one computer processor, defining a type of storage technology where certain deficiencies or shortcomings of a given physical medium are exploited, by the at least one computer processor, to achieve a secure, tamper proof, type of computer storage medium comprising at least one of:
triggering, by the at least one computer processor, such media with known limitations on the number of re-writes to mark certain sectors as permanently un-modifiable as if the number re-writes have been exhausted;
triggering, by the at least one computer processor, such media with known limitations on the number of re-writes to mark certain sectors as permanently unreadable or corrupt as if the number re-writes have been exhausted or it is physically corrupt;
applying to various media types comprising at least one of: flash drives or NAND; or
marking physical media as destroyed and permanently unreadable at the physical hardware level;
wherein said at least one computer file system trap layer or said at least one computer file system filter layer interacts with other components comprising control of system time, comprising at least one of:
a. controlling incorporating the use of monitoring tools or components that intercept or poll the system time and determine whether system time is within an allowed range or not, comprising at least one of:
i. providing a time source that is used that is external or internal to the system to validate the system time relative to at least one of GMT or universal time, or
ii. allowing for a small deviation by the algorithm, based on the actual time source that allows for variance in time based on how long the clock has been running;
b. wherein if the system time is changed beyond an allowed deviation, then external tools provide for at least one of:
i. attempting to reset time and date according to average deviation time applied to how long the clock has been running, or
ii. if such attempt fails, then triggering said at least one computer file system trap layer or said at least one computer file system filter layer to at least one of: locking down at least one storage volume or repository, or preventing any modifications, or preventing all access; or
c. wherein time management system is self learning comprising: monitoring average deviation or maintaining an average on an ongoing basis at a regular interval resulting in an average number of seconds per period and at least one of:
i. when the system starts up, the time management component gets the system time and compares it to the time source (clock) and applies the average deviation to how long the clock has been running to determine whether it is within the allowable range or not;
ii. when if the external clock or time source is unavailable at boot time then the system is considered unsecure and the time is considered unverifiable and hence the system is locked down and all volumes are at least one of: set to read-only, or prevented from access by triggering such states on the at least one computer file system trap layer or said at least one computer file system filter layer associated with such volumes and partitions;
iii. when the system is running, the time management establishes a reference time and polls the system time at a regular interval, knowing what time to expect and hence it not necessarily having to query the time source for any additional time, and in this case any attempt to alter the time outside what is projected is reset accordingly and if the reset fails, then the system is set in an unsecure state and the at least one computer file system trap layer or said at least one computer file system filter layer is notified accordingly which triggers locking the volume, or taking the volume offline;
iv. when in the event the system is set to sleep, and then is woken up, then the time management tools detect that state and take the appropriate action to determine what the correct time is and reset accordingly, and failure to reset triggers an unsecure state and the associated locking of volumes in read-only or preventing all access;
v. when in some cases it is necessary to poll the physical external source to validate what the time is regardless of the projected time just in case the time management monitoring tools are unable to determine whether the system was asleep or not; and applies the same algorithm to reset the time accordingly;
vi. when in the event the secure time source or clock cannot be validated or queried then the unsecure state is triggered;
vii. when under a condition, if the time management tools are shutdown or the system locks down, and the at least one computer file system trap layer or said at least one computer file system filter layer prevents any access or modification of the volumes;

viii. when time management cannot be overridden, then changing the system motherboard, or BIOS battery cannot overrule the secure time; or ix. when the secure time source incorporates additional secure signatures or validation to determine that it is a trusted source, the system cannot be bluffed or spoofed, and such signatures and identifiers incorporate combinations of at least one of a hash code, an encryption, or a unique identified time on the time source itself; or d. wherein time management is incorporated as whole or partially within the at least one computer file system trap layer or said at least one computer file system filter layer; or e. wherein the system further comprises retention integration comprising secure communication with authorized applications at least one of external to the data management system, or in a partner application, wherein at least one of:

wherein, with these definitions, trusted and secure components can have certain privileges that allow the setting of the state of the individual files and directories under certain state and allow exclusive access to managing such state to the trusted applications; or wherein, these controls limit what operations comprising at least one of: file retention manipulation can be performed, when files can be retained, when the retention can be extended, when the file can be excluded from retention, or when the file is to be deleted, or eventually erased by the at least one computer file system trap layer or said at least one computer file system filter layer.

32. The computer implemented method according to claim 1, wherein said at least one computer file system trap layer or said at least one computer file system filter layer is implemented within a file system layer.

33. The computer implemented method according to claim 1, wherein said allowing, or said denying the attempted operation comprises:
allowing creating a file relating to the attempted operation on a first portion of the computer storage medium while restricting access to said first portion of the computer storage medium.

34. The computer implemented method according to claim 33, further comprising:
evaluating a content of said file relating to the attempted operation; and
at least one of allowing, or denying the attempted operation based on said evaluating.

35. The computer implemented method according to claim 1, further comprising:
evaluating a content of a file relating to the attempted operation; and
at least one of allowing, or denying the attempted operation based on said evaluating.

36. The computer implemented method according to claim 35, wherein said content is analyzed, by the at least one computer processor, for existence of harmful content; and
wherein said intercepting comprises intercepting upon file creation based on said computer file system operation access privilege.

37. The computer implemented method according to claim 36, wherein said harmful content comprises at least one of:
a computer virus,
malware,
adware,
spyware,
a computer worm, or
a malicious file.

38. The computer implemented method according to claim 26, wherein the method further comprises:
allowing, by the at least one computer processor, a file of said harmful content to be created to evaluate the contents of the file, and
deleting, by the at least one computer processor, the file if the file is determined to be harmful.

39. The method according to claim 1, wherein said at least a portion of the computer storage medium comprises at least one of:
a volume,
a directory, or
a partition.

40. The method according to claim 1, wherein said attempted operation comprises:
file creation.

41. An apparatus for providing a write once read many (WORM) computer storage device comprising:
a computer storage device comprising at least two partitions;
a first of said at least two partitions comprising control components; and
a second of said at least two partitions comprising encrypted data; wherein said storage device is adapted to be coupled via an interface to a system, wherein said system is configured to apply an operation access privilege to said computer storage medium, comprising:
being configured to associate an access privilege with at least a portion of the computer storage medium;
being configured to intercept an attempted operation on said at least a portion of the computer storage medium,
wherein said being configured to intercept occurs regardless of an identity of a user attempting the attempted operation;
being configured to compare the attempted operation to the access privilege; and
being configured to allow, or deny the attempted operation based on comparing the attempted operation to the access privilege
wherein at least one of: said being configured to associate, to allow, or to deny is based on enforcing a policy.

42. A computer implemented method for intercepting, by at least one computer processor, an attempted download of data to at least a portion of a computer storage medium, comprising:
receiving, by the at least one computer processor, at least one attempted download operation to store the data, by the at least one computer processor, on the at least a portion of the computer storage medium;
intercepting, by the at least one computer processor, by at least one computer file system trap layer or at least one computer file system filter layer the at least one attempted download operation on the at least a portion of the computer storage medium,
wherein said intercepting, by the at least one computer processor, occurs regardless of an identity of a user attempting the attempted operation;
determining, by the at least one computer processor, whether the at least one attempted download operation is permitted based upon analysis, by the at least one computer processor, of the content of the data as well as based on a comparison of the at least one attempted download operation to a computer file system operation access privilege, and permitting, or not permitting, by the at least one computer processor, the at least one attempted download operation based on said determining, by the at least one computer processor.

43. The computer implemented method of claim 42, wherein the analysis, by the at least one computer processor, is performed on at least one of a same or a different device than the device comprising the storage device.

44. A computer implemented method for intercepting, by at least one computer processor, an attempted operation on at least a portion of a computer storage medium, comprising:
receiving, by the at least one computer processor, at least one attempted operation comprising creating an executable file to operate on data with respect to the at least a portion of the computer storage medium;
intercepting, by the at least one computer processor, by at least one computer file system trap layer or said at least one computer file system filter layer said at least one attempted operation comprising creating said executable file on the computer storage medium,
wherein said intercepting, by the at least one computer processor, occurs regardless of an identity of a user attempting the attempted operation;
determining, by the at least one computer processor, whether the at least one attempted operation is permitted based upon analysis, by the at least one computer processor, of the content of the data,
wherein the analysis, by the at least one computer processor, identifies, by the at least one computer processor, content comprising at least one of:
harmful content,
a computer virus,
malware,
adware,
spyware,
a computer worm, or
a malicious file; and
permitting, or not permitting the attempted operation comprising creating said executable file based on said determining.

45. The computer implemented method of claim 44, wherein the analysis, by the at least one computer processor, is performed on at least one of: a same or a different device than the device comprising the storage device.

46. The computer implemented method of claim 44, wherein the attempted operation, by the at least one computer processor, comprises at least one of:
reading, by the at least one computer processor, from, accessing, by the at least one computer processor, writing, by the at least one computer processor, to, sending, by the at least one computer processor, to, or receiving, by the at least one computer processor, from, the at least a portion of the storage device.

47. The computer implemented method of claim 44, wherein said intercepting, by the at least one computer processor, comprises:
intercepting, by the at least one computer processor, a request for said at least one attempted operation, and
at least one of:
waiting, by the at least one computer processor, for a user intervention, or
waiting, by the at least one computer processor, for a determination whether the operation should be allowed.

48. The computer implemented method of claim 44, wherein said intercepting, by the at least one computer processor, comprises at least one of:
determining, by the at least one computer processor, or validating, by the at least one computer processor, at least one of a signature or another identifier of a file; or
determining, by the at least one computer processor, if a file is one of: known origin, or unknown origin.

49. The computer implemented method of claim 44, wherein said intercepting, by the at least one computer processor, comprises:
intercepting, by the at least one computer processor, all operations on a file of unknown origin; and
determining, by the at least one computer processor, an action to be taken comprising at least one of:
suspending, by the at least one computer processor, operation until at least one of a user intervention, or an administrator intervention; or
denying and rejecting, by the at least one computer processor, at least one of said attempted operation on said file of unknown origin.

50. The computer implemented method of claim 44, wherein said intercepting comprises:
intercepting, by the at least one computer processor, said at least one attempted operation; and
at least one of:
modifying, by the at least one computer processor, said at least one attempted operation to at least one of:
prevent modification, by the at least one computer processor,
triggering, by the at least one computer processor, an action; or
triggering, by the at least one computer processor, a delete on file close;
modifying, by the at least one computer processor, a privilege on a file open operation to at least one of:
removing, by the at least one computer processor, write access, or
prohibiting, by the at least one computer processor, write access; or
marking, by the at least one computer processor, a file for deletion, and upon file close automatically deleting, by the at least one computer processor, the file.

51. The computer implemented method of claim 44, wherein said intercepting, by the at least one computer processor, is implemented within a file system layer.

52. A method for intercepting an attempted download of data to at least a portion of a computer storage medium, comprising:
receiving at least one attempted download operation to store the data on the at least a portion of the computer storage medium;
intercepting by at least one computer file system trap layer or said at least one computer file system filter layer the at least one attempted download operation on the at least a portion of the computer storage medium,
wherein said intercepting occurs regardless of an identity of a user attempting the attempted operation;
determining whether the at least one attempted download operation is permitted based upon analysis of the content of the data, and
permitting, or not permitting the at least one attempted download operation based on said determining.

53. The method of claim 52, wherein the analysis is performed on at least one of a same or a different device than the device comprising the storage device.

54. A method for intercepting an attempted operation on at least a portion of a computer storage medium, comprising:
receiving at least one attempted operation to operate on data with respect to the at least a portion of the computer storage medium, wherein said at least one attempted operation comprises creating at least one file capable of being executed on a computer processor;

intercepting by at least one computer file system trap layer or said at least one computer file system filter layer said at least one attempted operation comprising creating said at least one file on the computer storage medium, wherein said intercepting occurs regardless of an identity of a user attempting the attempted operation of creating said at least one file;

determining whether the at least one attempted operation is permitted based upon analysis of the content of the data, wherein the analysis identifies content comprising at least one of:
  harmful content,
  a computer virus,
  malware,
  adware,
  spyware,
  a computer worm, or
  a malicious file; and permitting, or not permitting the attempted operation comprising creating a file capable of execution based on said determining.

55. The method of claim 54, wherein the analysis is performed on at least one of: a same or a different device than the device comprising the storage device.

56. The method of claim 54, wherein the attempted operation comprises at least one of:
  reading from,
  accessing,
  writing to,
  sending to, or
  receiving from, the at least a portion of the storage device.

57. The method of claim 54, wherein said intercepting comprises:
  intercepting a request for said at least one attempted operation, and at least one of:
    waiting for a user intervention, or
    waiting for a determination whether the operation should be allowed.

58. The method of claim 54, wherein said intercepting comprises at least one of:
  determining or validating at least one of a signature or another identifier of a file; or
  determining if a file is one of: known origin, or unknown origin.

59. The method of claim 54, wherein said intercepting comprises:
  intercepting all operations on a file of unknown origin; and
  determining an action to be taken comprising at least one of:
    suspending operation until at least one of a user intervention, or an administrator intervention; or
    denying and rejecting at least one of said attempted operation on said file of unknown origin.

60. The method of claim 54, wherein said intercepting comprises:
  intercepting said at least one attempted operation; and
  at least one of:
    modifying said at least one attempted operation to at least one of:
      prevent modification,
      triggering an action; or
      triggering a delete on file close;
    modifying a privilege on a file open operation to at least one of:
      removing write access, or
      prohibiting write access; or
    marking a file for deletion, and upon file close automatically deleting the file.

61. The method of claim 54, wherein said intercepting is implemented within a file system layer.

62. A non-transitory computer accessible storage medium embodied thereon computer program product, said computer program product for applying a computer file system operation access privilege to a computer storage medium when executed on at least one computer processor, performing a method of:
  associating, by the at least one computer processor, the computer file system operation access privilege with at least a portion of the computer storage medium;
  intercepting, by the at least one computer processor, by at least one computer file system trap layer or said at least one computer file system filter layer an attempted operation on said at least a portion of the computer storage medium,
    wherein said intercepting occurs regardless of an identity of a user attempting the attempted operation;
  comparing, by the at least one computer processor, the attempted operation to the operation access privilege; and
  allowing, or denying, by the at least one computer processor, the attempted operation based on the comparing of the attempted operation to the operation access privilege.

63. The computer program product according to claim 62, wherein said allowing or said denying of the attempted operation of the method comprises at least one of:
  allowing, or denying, by the at least one computer processor, the attempted operation based on a content of a logical file associated with said at least a portion of the computer storage medium;
  allowing, or cancelling, by the at least one computer processor, the attempted operation based on the content of the file; or
  allowing, by the at least one computer processor, a create file operation to create a file on at least a portion of the computer storage medium, evaluating, by the at least one computer processor, a content of the file, and at least one of: allowing, by the at least one computer processor, the attempted operation, or deleting, by the at least one computer processor, the file based on said evaluating.

64. The method according to claim 62, wherein said associating the access privilege comprises associating the access privilege with said at least a portion of the computer storage medium based on a file attribute of a logical file associated with said at least a portion of the computer storage medium.

65. The method according to claim 62, wherein said enforcing the access privilege comprises enforcing a retention access privilege comprising preventing said a least a portion of the computer storage medium in a retained state from being modified while a retention period of said at least a portion of the computer storage medium is unexpired.

66. A data processing system configured to apply a computer file system operation access privilege to a computer storage medium, comprises:
  at least one computer processor configured to associate the computer file system operation access privilege with at least a portion of the computer storage medium;
  said at least one computer processor configured to intercept, by at least one computer file system trap layer or at least one computer file system filter layer, an attempted operation on said at least a portion of the computer storage medium,
wherein said interception occurs regardless of an identity of a user that attempts the attempted operation;
said at least one computer processor configured to compare the attempted operation to the computer file system operation access privilege; and
said at least one computer processor configured to allow, or deny the attempted operation based on the comparison of the attempted operation to the computer file system operation access privilege.

67. The data processing system according to claim 66, wherein said allowance or said denial of the attempted operation comprises at least one of said at least one computer processor configured to allow, or deny the attempted operation based on a content of a logical file associated with said at least a portion of the computer storage medium.

68. The data processing system according to claim 67, wherein said allowance, or said denial comprises at least one of allowance, or cancellation of the attempted operation based on the content of the file.

69. The data processing system according to claim 66, wherein said allowance, or said denial of the attempted operation comprises being configured to:
allow a create file operation to create a file on at least a portion of the computer storage medium;
evaluate a content of the file; and
at least one of allowance of the attempted operation, or deletion of the file based on said evaluation.

70. The data processing system according to claim 66, wherein said association of the computer file system operation access privilege comprises association of the access privilege with said at least a portion of the computer storage medium based on a file attribute of a logical file associated with said at least a portion of the computer storage medium.

71. The data processing system according to claim 66, wherein said allowance or denial comprises:
enforcing the computer file system operation access privilege comprising:
enforcing a retention access privilege comprising:
preventing said a least a portion of the computer storage medium in a retained state from being modified while a retention period of said at least a portion of the computer storage medium is unexpired.

72. The data processing system according to claim 71, wherein said enforcing a retention access privilege is enforced for at least one of: a file name, a file attribute, a file path, or a file content, of a logical file associated with said at least a portion of the computer storage medium.

73. The method according to claim 71, wherein said enforcing a retention access privilege comprises determining if said at least a portion of the computer storage medium is eligible to enter the retained state based on a content of said at least a portion of the computer storage medium.

74. The method according to claim 73, wherein said determining comprises determining if said at least a portion of the computer storage medium is eligible to enter the retained state based on a content group associated with said at least a portion of the computer storage medium, the content group associated based on evaluating said at least a portion of the computer storage medium for pre-defined content.

75. The method according to claim 71, wherein said associating the access privilege comprises holding the retained state.

76. The method according to claim 75, wherein said holding the retained state comprises at least one of:
suspending expiration of a retained state portion of the computer storage medium;
suspending an unexpired retained state portion of the computer storage medium from entering an expired retained state;
suspending clearing of a read only attribute of the retained state portion of the computer storage medium by setting a temporary attribute of the retained state portion of the computer storage medium; or
suspending deletion of an expired retained state portion of the computer storage medium.

77. The method according to claim 66, wherein said enforcing the access privilege comprises enforcing a retention access privilege comprising triggering one or more background processes when said at least a portion of the computer storage medium enters a retained state.

78. The method according to claim 77, wherein the one or more background processes comprises at least one of:
creating metadata for the retention;
identifying the user retaining said at least a portion of the computer storage medium;
storing user identification for the user retaining said at least a portion of the computer storage medium;
identifying the retention access privilege retaining said at least a portion of the computer storage medium;
storing the retention access privilege retaining said at least a portion of the computer storage medium;
generating a digital signature of the content of said at least a portion of the computer storage medium;
generating a digital signature comprising a hash of the content of said at least a portion of the computer storage medium;
generating a digital signature of the content of at least one of a default data stream associated with a file associated with said at least a portion of the computer storage medium or one or more alternate data streams associated with the file associated with said at least a portion of the computer storage medium;
storing the digital signature;
determining if any other policies apply;
creating at least one of an alternate data stream or an extended attribute to store the metadata;
encrypting hash keys for the metadata; or storing the hash keys.

79. The method according to claim 71, wherein said enforcing the retention access privilege comprises triggering retention of said at least a portion of the computer storage medium based on at least one of:
the attempted operation;
setting a read-only attribute of the file;
renaming the file to a file name;
renaming the file to a particular name;
resizing the file;
resizing the file to a particular size;
creating an extended attribute associated with the file; or
creating an alternate data stream associated with the file.

80. The method according to claim 71, wherein said enforcing the retention access privilege comprises enforcing an archive access privilege comprising queuing said at least a portion of the computer storage medium to be copied to an alternate media, when said at least a portion of the computer storage medium is retained.

81. The method according to claim 66, wherein said allowing, or said denying the attempted operation comprises forcing a secure erasure for a delete operation on said at least a portion of the computer storage medium, wherein the secure erasure comprises at least one of overwriting the content of said at least a portion of the computer storage medium or overwriting an alternate data stream associated with said at least a portion of the computer storage medium.

82. The method according to claim 66, wherein said allowing, or said denying comprises at least one of:
   allowing the operation on a directory if the directory is empty; or
   denying the operation on the directory if the directory is not empty.

83. The method according to claim 66, wherein said allowing, or said denying comprises at least one of allowing, or denying the attempted operation based on at least one of an application or a process attempting the attempted operation.

84. The method according to claim 83, wherein said allowing, or said denying the attempted operation based on at least one of the application or the process comprises at least one of:
   allowing the attempted operation for at least one of a named or a registered process;
   denying the attempted operation for at least one of the named or the registered process; or
   allowing the attempted operation for a privileged application, the privileged application comprising an application operable to be authenticated via a digital signature.

85. The method according to claim 66, wherein said enforcing the access privilege comprises enforcing a access privilege based on an application, the access privilege comprising at least one of:
   enforcing application based intercepting of the attempted operation;
   disabling an operation option provided to the user;
   expanding the scope of an operation based on the application; or
   at least one of allowing, or denying the attempted operation based on validating a child object of a parent object of an attempted operation.

86. The method according to claim 66, wherein said enforcing the access privilege comprises enforcing a secure time routine, the routine comprising at least one of:
   using a secure clock;
   maintaining a system clock comprising using the secure clock;
   accounting for deviations based on inaccuracies of the secure clock;
   verifying operation of a secure clock or authenticating the secure clock;
   at least one of:
      denying at least one attempted operation,
      preventing said at least a portion of the computer storage medium from being retained, or
      rendering the computer storage medium read-only, if the secure clock can not be at least one of: verified or authenticated; or
   running the secure clock independent of a server.

87. The method according to claim 66, further comprising:
   evaluating a content of a file relating to the attempted operation; and
   at least one of allowing, or denying the attempted operation based on said evaluating.

88. The method according to claim 87, wherein said content is analyzed for existence of harmful content.

89. The method according to claim 88, wherein said harmful content comprises at least one of:
   a computer virus,
   malware,
   adware,
   spyware,
   a computer worm, or
   a malicious file.

90. The method according to claim 88, wherein the method further comprises:
   allowing a file of said harmful content to be created to evaluate the contents of the file, and
   deleting the file if the file is determined to be harmful.

91. The method according to claim 66, further comprising:
   evaluating content of a file wherein said file launches a process; and
   launching the process to determine at least one restriction or access privilege for the process.

92. The method according to claim 91, comprising:
   determining a harmful process belongs to a virus based on said launching; and disabling at least one operation for said harmful process.

93. The method of claim 66, further comprising at least one of:
   assigning metadata to a given file relating to operations permitted on said given file;
   assigning metadata to a given file relating to validating contents of a given file; or
   confirming contents have not been modified or tampered with, comprising at least one of: a hash, a hash key, an SHA hash, an encryption key, or a digital signature.

94. The method of claim 66, wherein said intercepting further comprises at least one of:
   interacting between said at least one computer file system trap layer or said at least one computer file system filter layer and at least one other component;
   retrieving additional information by said at least one computer file system trap layer or said at least one computer file system filter layer; or
   determining a role said at least one computer file system trap layer or said at least one computer file system filter layer will perform comprising whether to at least one of:
   allow, reject, or modify a request.

95. The method of claim 66, wherein said intercepting further comprises:
   triggering by said at least one computer file system trap layer or said at least one
   computer file system filter layer initiating other actions comprising at least one of:
      intercepting a delete operation, and
      determining when to actually erase contents,
         wherein, at least one of:
            an erasure comprises overwriting at least one of content or at least a portion of a file with a predetermined pattern;
            an erasure is triggered immediately; or
            an erasure is tagged when the file is marked for deletion and at least one of:
               the actual erasure takes place once the file is closed, depending on file system; or
               the erasure is performed on file cleanup after the file is closed.

96. The method of claim 66, wherein said intercepting further comprising:
   triggering by said at least one computer file system trap layer or said at least one computer file system filter layer initiating other actions comprising at least one of:
      creating file signatures upon certain conditions comprising when the file retention is triggered comprising at least one of:
         creating said file signature when the file is finally closed and is no longer modified;
         creating said file signature triggered immediately; or creating said file signature when the file is in final cleanup and all handles or channels are closed, or contents are flushed from the cache.

97. The method of claim 66, wherein said intercepting further comprises at least one of:
   triggering by said at least one computer file system trap layer or said at least one computer file system filter layer initiating other actions comprising at least one of:
      intercepting at least one of: a plurality of file types; at least one directory; or alternate data streams;
      interrogating contents of at least one directory to enable additional operations comprising at least one of:
         determining if said at least one directory is empty, or not,
         determining whether to allow at least one of rename, or delete operations,
         determining if the at least one directory is not empty and if not empty, then at least one of:
            rejecting all delete operations,
            rejecting all rename operations, or
            rejecting all move operations, or
         determining if the at least one directory is not empty, and if not empty, then at least one of:
            allowing all operations, or
            allowing certain operations;
      intercepting an open directory for enumeration operation to prevent browsing of at least one directory contents comprising at least one of:
         allowing file and directory operations that are for a specific file or directory name to succeed, but making operations enumerating contents fail;
      intercepting similar operations comprising at least one of: modifying security, adding or removing files, changing attributes, or adding or removing directories;
      intercepting operations to the default data stream portion of a file, or alternate data streams, and conditionally allowing, disallowing, or modifying such requests depending on policies; or
      determining policies dynamically by at least one of: querying a parent directory, querying a parent volume, querying associated policies, defining policies at an individual object level, forcing additional operations, or triggering other operations.

98. The method of claim 66, wherein said at least one computer file system trap layer or said at least one computer file system filter layer automatically encrypts or decrypts contents of a logical storage volume or medium, and at least one of:
   wherein if the at least one computer file system trap layer or said at least one computer file system filter layer is unavailable then contents are obscured by the encryption of the contents on the physical volume;
   wherein if the at least one computer file system trap layer or said at least one computer file system filter layer determines conditions are normal, then the at least one computer file system trap layer or said at least one computer file system filter layer allows access to the volume and decrypts contents allowing the actual files to be accessed as a normal file system; or
   wherein if the at least one computer file system trap layer or said at least one computer file system filter layer determines that conditions are abnormal, then the at least one computer file system trap layer or said at least one computer file system filter layer rejects all access requests.

99. The method of claim 66, wherein said intercepting is further comprising at least one of:
   triggering by said at least one computer file system trap layer or said at least one computer file system filter layer initiating other actions comprising at least one of:
      intercepting an additional partition, or volume management operations, and
      depending on the protection policies, at least one of allows or disallows said volume management operations, or modifies said volume management operations to prohibit any anomalies comprising at least one of:
         preventing delete or format operations on protected partitions; or
         intercepting other operations comprising at least one of:
            snapshot creation,
            dismount operations, or
            partition resizing comprising:
               shrinking, or
               expansion.

100. The method of claim 66, wherein said intercepting comprising at least one of:
   wherein said at least one computer file system trap layer or said at least one computer file system filter layer is implemented to at least one of: validate and compare byte streams, or look for digital signatures;
   wherein said at least one computer file system trap layer or said at least one computer file system filter layer interacts with additional components on the hardware level to at least one of: determine additional operations or restrictions, or to trigger additional actions within the at least one computer file system trap layer or said at least one computer file system filter layer, or to trigger additional actions at the hardware layer;
   wherein said at least one computer file system trap layer or said at least one computer file system filter layer triggers additional actions on a physical storage device comprising at least one of: triggering certain logical, or physical sectors of the computer storage medium to become un-readable, un-writable; or un-modifiable;
   wherein said at least one computer file system trap layer or said at least one computer file system filter layer enables defining a type of storage technology where certain deficiencies or shortcomings of a given physical medium are exploited to achieve a secure, tamper proof, type of computer storage medium comprising at least one of:
      triggering such media with known limitations on the number of re-writes to mark certain sectors as permanently un-modifiable as if the number re-writes have been exhausted;
      triggering such media with known limitations on the number of re-writes to mark certain sectors as permanently unreadable or corrupt as if the number re-writes have been exhausted or it is physically corrupt;
      applying to various media types comprising at least one of: flash drives or NAND; or
      marking physical media as destroyed and permanently unreadable at the physical hardware level;
   wherein said at least one computer file system trap layer or said at least one computer file system filter layer interacts with other components comprising control of system time, comprising at least one of:
   a. controlling incorporating the use of monitoring tools or components that intercept or poll the system time and determine whether system time is within an allowed range or not, comprising at least one of:

i. providing a time source that is used that is external or internal to the system to validate the system time relative to at least one of GMT or universal time, or
ii. allowing for a small deviation by the algorithm, based on the actual time source that allows for variance in time based on how long the clock has been running;
b. wherein if the system time is changed beyond an allowed deviation, then external tools provide for at least one of:
iii. attempting to reset time and date according to average deviation time applied to how long the clock has been running, or
iv. if such attempt fails, then triggering said at least one computer file system trap layer or said at least one computer file system filter layer to at least one of: locking down at least one storage volume or repository, or preventing any modifications, or preventing all access; or
c. wherein time management system is self learning comprising: monitoring average deviation or maintaining an average on an ongoing basis at a regular interval resulting in an average number of seconds per period and at least one of:
v. when the system starts up, the time management component gets the system time and compares it to the time source (clock) and applies the average deviation to how long the clock has been running to determine whether it is within the allowable range or not;
vi. when if the external clock or time source is unavailable at boot time then the system is considered unsecure and the time is considered unverifiable and hence the system is locked down and all volumes are at least one of: set to read-only, or prevented from access by triggering such states on the at least one computer file system trap layer or said at least one computer file system filter layer associated with such volumes and partitions;
vii. when the system is running, the time management establishes a reference time and polls the system time at a regular interval, knowing what time to expect and hence it not necessarily having to query the time source for any additional time, and in this case any attempt to alter the time outside what is projected is reset accordingly and if the reset fails, then the system is set in an unsecure state and the at least one computer file system trap layer or said at least one computer file system filter layer is notified accordingly which triggers locking the volume, or taking the volume offline;
viii. when in the event the system is set to sleep, and is woken up, then the time management tools detect that state and take the appropriate action to determine what the correct time is and reset accordingly, and failure to reset triggers an unsecure state and the associated locking of volumes in read-only or preventing all access;
ix. when in some cases it is necessary to poll the physical external source to validate what the time is regardless of the projected time just in case the time management monitoring tools are unable to determine whether the system was asleep or not; and applies the same algorithm to reset the time accordingly;
x. when in the event the secure time source or clock cannot be validated or queried then the unsecure state is triggered;
xi. when under a condition, if the time management tools are shutdown or the system locks down, and the at least one computer file system trap layer or said at least one computer file system filter layer prevents any access or modification of the volumes;
xii. when time management cannot be overridden, then changing the system motherboard, or BIOS battery cannot overrule the secure time; or
xiii. when the secure time source incorporates additional secure signatures or validation to determine that it is a trusted source, the system cannot be bluffed or spoofed, and such signatures and identifiers incorporate combinations of at least one of a hash code, an encryption, or a unique identified time on the time source itself; or
d. wherein time management is incorporated as whole or partially within the at least one computer file system trap layer or said at least one computer file system filter layer; or
e. wherein the system further comprises retention integration comprising secure communication with authorized applications at least one of external to the data management system, or in a partner application, wherein at least one of:
wherein, with these definitions, trusted and secure components can have certain privileges that allow the setting of the state of the individual files and directories under certain state and allow exclusive access to managing such state to the trusted applications; or
wherein, these controls limit what operations comprising at least one of: file retention manipulation can be performed, when files can be retained, when the retention can be extended, when the file can be excluded from retention, or when the file is to be deleted, or eventually erased by the at least one computer file system trap layer or said at least one computer file system filter layer.

101. The method according to claim 66, wherein said at least one computer file system trap layer or said at least one computer file system filter layer is implemented within a file system layer.

102. The method according to claim 66, wherein said allowing, or said denying the attempted operation comprises:
allowing creating a file relating to the attempted operation on a first portion of the computer storage medium while restricting access to said first portion of the computer storage medium.

103. The method according to claim 102, further comprising:
evaluating a content of said file relating to the attempted operation; and
at least one of allowing, or denying the attempted operation based on said evaluating.

* * * * *